United States Patent [19]
Liu et al.

[11] Patent Number: 6,128,335
[45] Date of Patent: Oct. 3, 2000

[54] SOFTWARE RATE ADAPTABLE MODEM WITH FORWARD COMPATIBLE AND EXPANDABLE FUNCTIONALITY AND METHOD OF OPERATION

[75] Inventors: Young Way Liu, La Mirada; Ming-Kang Liu, Cupertino; Steve Chen, San Jose, all of Calif.

[73] Assignee: Integrated Telecom Express, Santa Clara, Calif.

[21] Appl. No.: 08/884,957

[22] Filed: Jun. 30, 1997

[51] Int. Cl.[7] ........................................ H04B 1/38
[52] U.S. Cl. ........................ 375/220; 375/222; 370/480
[58] Field of Search ................................ 375/219, 220, 375/222, 260, 316, 354, 200.63; 347/251; 364/148, 705.05; 370/94.2, 445, 480, 485, 492; 379/93.14; 455/522

[56] References Cited

U.S. PATENT DOCUMENTS

| H1410 | 1/1995 | Hartley .................................... 364/148 |
| 4,620,294 | 10/1986 | Leung et al. ............................ 364/900 |
| 4,847,863 | 7/1989 | Watson ...................................... 375/8 |

(List continued on next page.)

FOREIGN PATENT DOCUMENTS

| 0806852 | 11/1997 | European Pat. Off. . |
| 0820168 | 1/1998 | European Pat. Off. . |
| 0828363 | 3/1998 | European Pat. Off. . |
| 0831624 | 3/1998 | European Pat. Off. . |
| 9528773 | 10/1995 | WIPO . |
| 9859426 | 12/1998 | WIPO . |

OTHER PUBLICATIONS

Polley et al. "Performance Estimation of a Low Complexity ATU–R," Contribution #T1E1.4/97–096, T1E1.4 Technical Subcommittee Working Group Members, Feb. 3–7 1997, pp. 1–6.

Melsa, et al. "Proposal for Use of R–ACK3," Contribution #T1E1.4/96–312, T1E1.4 Technical Subcommittee Working Group Members, Nov. 11, 1996, pp. 1–2.

Chellali, et al. "Inter–operation of an MDSL Residential Unit and an ATU–C," Contribution #T1E1.4/96–359, T1E1.4 Technical Subcommittee Working Group Members, Nov. 11, 1996, pp. 1–7.

Chen, et al. "Attributes of the Medium–bit–rate Digital Subscriber Lines (MDSL) Technology," Contribution #T1E1.4/96–282, T1E1.4 Technical Subcommittee Working Group Members, Sep. 4, 1996, pp. 1–8.

Chen, et al. "Possibilities for the Low Complexity ATU–R Identification," Contribution #T1E1.4/96–281, T1E1.4 Technical Subcommittee Working Group Members, Sep. 4, 1996, pp. 1–4.

(List continued on next page.)

*Primary Examiner*—Stephen Chin
*Assistant Examiner*—Chieh M. Fan
*Attorney, Agent, or Firm*—Law+

[57] ABSTRACT

A high speed software modem is described which uses a selectable, desirable portion of the total available bandwidth of a transmission channel. In a preferred embodiment, the invention is implemented in a personal computer connected to an upstream transceiver through a channel supporting an Asymmetric Digital Subscriber Loop (ADSL) standard. The achievable target data rate of the modem is based on the capabilities of an analog front end (AFE) used in the modem, and a host processor within such personal computer. In particular, the modem AFE contains subband filtering which causes an upstream transceiver to use only a selected number of available sub-channels for downstream data transmission. The data rate of the modem is increased by upgrading the AFE or the host processor in order to increase the number of processable transmitted downstream sub-channels.

52 Claims, 10 Drawing Sheets

U.S. PATENT DOCUMENTS

| | | |
|---|---|---|
| 5,161,154 | 11/1992 | Diaz ........................................ 370/95.1 |
| 5,170,470 | 12/1992 | Pindar ...................................... 395/275 |
| 5,285,474 | 2/1994 | Chow et al. ............................... 375/13 |
| 5,479,447 | 12/1995 | Chow et al. ............................. 375/260 |
| 5,519,731 | 5/1996 | Cioffi ....................................... 375/260 |
| 5,524,122 | 6/1996 | Lepitre et al. ........................... 375/222 |
| 5,557,612 | 9/1996 | Bingham ................................... 370/71 |
| 5,565,907 | 10/1996 | Wada et al. .............................. 347/251 |
| 5,596,604 | 1/1997 | Cioffi ....................................... 345/260 |
| 5,625,651 | 4/1997 | Cioffi ....................................... 375/354 |
| 5,627,863 | 5/1997 | Aslanis et al. ........................... 375/357 |
| 5,666,383 | 9/1997 | Huang et al. ............................ 375/260 |
| 5,677,905 | 10/1997 | Bigham et al. ......................... 370/94.2 |
| 5,678,059 | 10/1997 | Ramaswamy et al. ................. 395/821 |
| 5,689,527 | 11/1997 | Hawkins et al. ........................ 375/222 |
| 5,715,280 | 2/1998 | Sandberg et al. ....................... 375/260 |
| 5,724,413 | 3/1998 | Suffern et al. ........................... 379/98 |
| 5,742,527 | 4/1998 | Rybicki et al. .................... 364/705.05 |
| 5,751,716 | 5/1998 | Tzannes et al. ......................... 370/468 |
| 5,765,021 | 6/1998 | Hsu et al. ................................ 395/828 |
| 5,832,387 | 11/1998 | Bae et al. ................................ 455/522 |
| 5,835,536 | 11/1998 | May et al. ............................... 375/316 |
| 5,852,655 | 12/1998 | McHale et al. ...................... 379/93.14 |
| 5,982,814 | 11/1999 | Yeh et al. ................................ 375/222 |

OTHER PUBLICATIONS

Walter Chen, "A Proposal for ADSL Issue II to Include the Low Complexity ATU–R," Contribution #T1E1.4/96–199R1, T1E1.4 Technical Subcommittee Working Group Members, Jul. 22, 1996, pp. 1–5.

Peter S. Chow, et al, "A Practical Discrete Transceiver Loading Algorithm for Data Transmission over Spectrally Shaped Channel," IEEE Transactions on Communications, vol. 43, No. 2/3/4, Feb./Mar./Apr., 1995, pp. 773–775.

Ian Galton and Henrik Jensen, "Delta–Sigma Modulator Based A/D Conversion without Oversampling," IEEE Transactions on Circuits and Systems—II: Analog and Digital Signal Processing, vol. 42, No. 12, Dec. 1995, pp. 773–784.

R. Khoini–Poorfard and D.A. Johns, "Time–Interleaved Oversampling Convertors," Electronics Letters, vol. 29, No. 19, Sep. 16, 1993, pp. 1673–1675.

Pervez M. Aziz, et al, "Multi Band Sigma Delta Analog to Digital Conversion," International Conference on Acoustics, Speech and Signal Processing, pp. 249–252, Apr. 19–22, 1994.

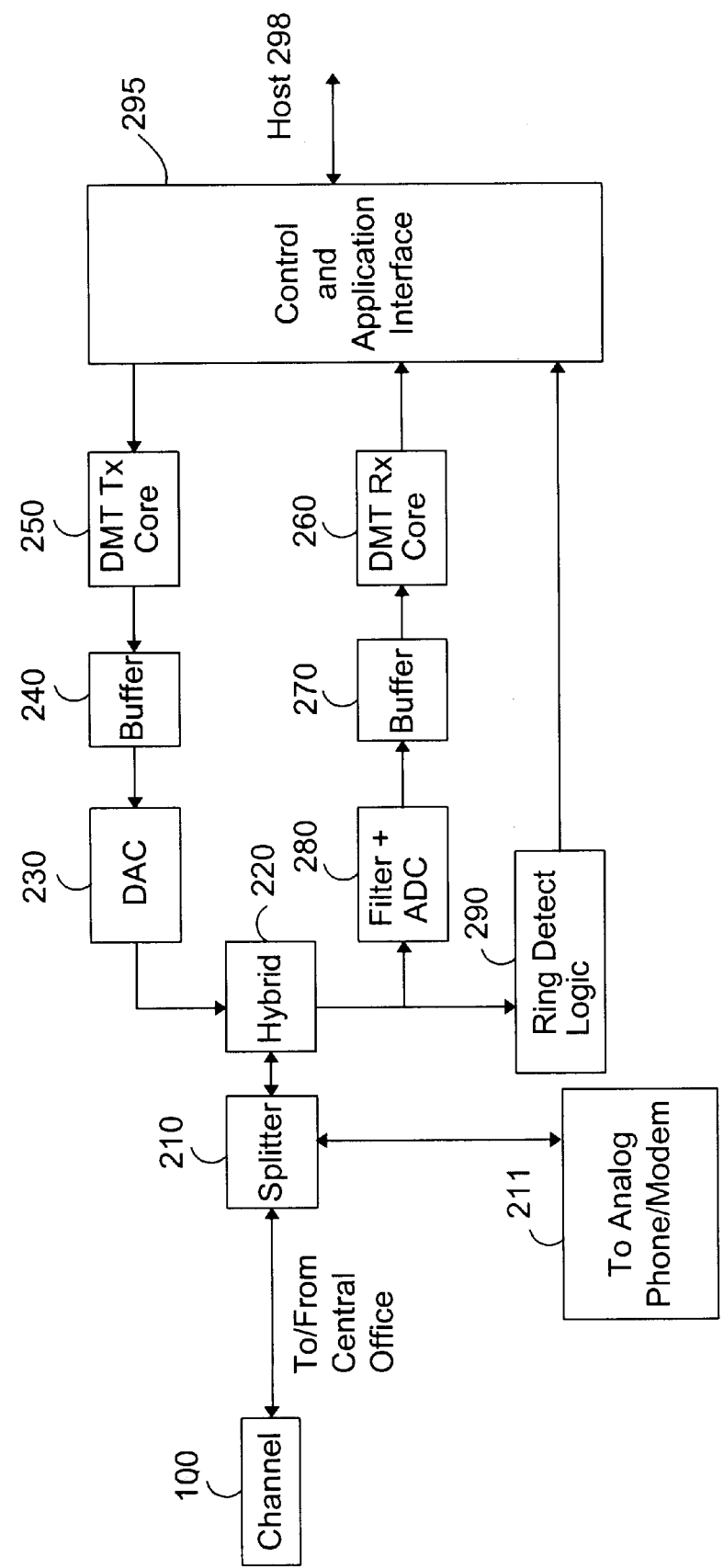

SOFTWARE RATE ADAPTABLE MODEM WITH FORWARD COMPATIBLE AND EXPANDABLE FUNCTIONALITY AND METHOD OF OPERATION

CROSS REFERENCE TO RELATED APPLICATIONS

The present application is related to the following additional applications, all of which are being filed concurrently herewith:

Attorney Docket No. ITE 97-001 entitled "Forward Compatible And Expandable High Speed Communications System & Method of Operation."

Attorney Docket No. ITE 97-002 entitled "Rate Adaptable Modem With Forward Compatible and Expandable Functionality & Method of Operation."

Attorney Docket No. ITE 97-004 entitled "Modular Multiplicative Data Rate Modem & Method of Operation."

Attorney Docket No. ITE 97-005 entitled "Device Driver For Rate Adaptable Modem With Forward Compatible and Expandable Functionality"

Attorney Docket No. ITE 97-006 entitled "User Controllable Applications Program For Rate Adaptable Modem With Forward Compatible and Expandable Functionality."

FIELD OF THE INVENTION

The invention relates generally to an improved high-speed communications system which establishes a data link using only a selectable portion of the total available bandwidth (potential downstream data transmission) of a channel. The present invention permits the characteristics (including target data rate) of the link to be controlled based on the capabilities of an analog front end (AFE) and the processing power of a host system incorporating the communications system. In this manner, the system is forward expandable in functionality, and permits a user to increase throughput to the point of achieving full potential of the available chanel bandwidth.

BACKGROUND OF THE INVENTION

Remote access and retrieval of data and information are becoming more desirable and common in both consumer and business environments. As data and information transfer is becoming more and more voluminous and complex, using traditional data links such as voice-band modems is too slow in speed. For example, the use of the Internet to locate and access information is increasing daily, but the retrieval of typical graphics, video, audio, and other complex data forms is generally unsatisfyingly slow using conventional voice-band modems. In fact, the slow rate of existing dial-up analog modems frustrates users, and commerce and interaction using the Internet would have been even higher were it not for the unacceptable delays associated with present day access technology. The ability to provide such desired services as video on demand, television (including HDTV), video catalogs, remote CD-ROMs, high-speed LAN access, electronic library viewing, etc., are similarly impeded by the lack of high speed connections.

Since the alternatives to copper line technology have proven unsatisfactory, solutions to the high speed access problem have been focused on improving the performance of voice band modems. Voice band modems operate at the subscriber premises end over a 3 kHz voice band lines and transmit signals through the core switching network; the phone company network treats them exactly like voice signals. These modems presently transmit up to 33.6 kbps over a 2-wire telephone line, even though the practical speed only twenty years ago was 1.2 kbps. The improvement in voice band modems over the past 20 years has resulted from significant advances in algorithms, digital signal processing, and semiconductor technology. Because such modems are limited to voice bandwidth (3.0 kHz), the rate is bound by the Shannon limit, around 30 kbps. A V.34 modem, for example, achieves 10 bits per Hertz of bandwidth, a figure that approaches the theoretical Shannon limits.

There is a considerable amount of bandwidth available in copper lines, however, that has gone unused by voice band modems, and this is why a proposal known as Asymmetric Digital Subscriber line (ADSL) was suggested in the industry as a high-speed protocol/connection alternative. The practical limits on data rate in conventional telephone line lengths (of 24 gauge twisted pair) vary from 1.544 Mbps for an 18,000 foot connection, to 51.840 Mbps for a 1,000 foot connection. Since a large proportion of current telephone subscribers fall within the 18,000 foot coverage range, ADSL can make the current copper wire act like a much "bigger pipe" for sending computer bits and digital information (like movies and TV channels), while still carrying the voice traffic. For example, an ADSL modem can carry information 200 times faster than the typical voice band modem used today.

ADSL is "asymmetric" in that more data goes downstream (to the subscriber) than upstream (back from the subscriber). The reason for this is a combination of cost, demand, and performance. For example, twisted pair wiring coupling increases with the frequency of the signal. If symmetric signals in many pairs are used within a cable, the data rate and line length become significantly limited by the coupling noise. Since the preponderance of target applications for digital subscriber services is asymmetric, asymmetric bit rate is not perceived to be a serious limitation at this time. Therefore, the ADSL standard proposes up to 6 Mbps for downstream, and up to 640 kbps for upstream. For example, video on demand, home shopping, Internet access, remote LAN access, multimedia access, and specialized PC services all feature high data rate demands downstream, to the subscriber, but relatively low data rates demands upstream. The principal advantage is that all of the high speed data operations take place in a frequency band above the voice band, leaving Plain Old Telephone Service (POTS) service independent and undisturbed, even if an ADSL modem fails. ADSL further provides an economical solution for transmission of high bandwidth information over existing copper line infrastructures.

Specifically, the proposed standard for ADSL divides the available transmission bandwidth into two parts. At the lower 4 kHz band, ordinary (POTS) is provided. The bulk of the rest bandwidth in the range from 4 kHz to about 1 MHz is for data transmission in the downstream direction, which is defined to be from the exchange to the subscriber. The upstream control channel uses a 160 kHz band in between. The signals in each channel can be extracted with an appropriate band-pass filter.

A DMT implementation of ADSL uses the entire available 1 MHz range of a copper phone line. It merely splits the signal into 255 separate channels, and each 4 kHz channel can be made to provide a bit rate up to the best present day voice band (33.6 kbs) modems. This results essentially in overall performance which is equivalent to around two hundred V.34 modems used in parallel on the same line. Because each channel can be configured to a different bit rate according to the channel characteristics, it can be seen that DMT is inherently "rate-adaptive" and extremely flexible for interfacing with different subscriber equipment and line conditions.

A number of problems arise, however, in attempting to implement a full scale ADSL transceiver cost-effectively.

First, to achieve this high bit rate transmission over existing telephone subscriber loops, advanced analog front end (AFE) devices, complicated digital signal processing techniques, and high speed complex digital designs are required. As a result, this pushes current technology limits and imposes both high cost and power consumption. For example, AFE devices in modem applications provide the interface between analog wave forms and digital samples for digital hardware/software processing. In high speed modem technologies such as ADSL, AFE devices need to operate at a very high sampling rate and high accuracy. For example, the DMT technology has a spectrum of 1 MHz and requires sampling above 50 MHz if a sigma-delta analog-to-digital (ADC) method is used. This thus requires the state-of-art ADC technology and imposes a high cost for end users.

Second, the time domain signal in ADSL/DMT transmissions is a summation of a large number of carriers modulated by quadrature amplitude modulation (QAM). This typically results in a large peak-to-peak deviation. As a result, even though a high speed AFE is made possible, a large dynamic range and high resolution AFE is required at the same time to minimize quantization errors.

Third, in addition to the high sampling rate and resolution requirement for ADSL AFEs, the other hardware and software in ADSL environment also needs to operate at a much higher speed than current conventional modem counterparts. For example, to implement the DMT technology in software, a custom and dedicated digital signal process (DSP) of a power of several hundred MIPS (millions instructions per second) is required to process many components such as error encoding and decoding, spectrum transforms, timing synchronization, etc. As with the AFE part of the system, this high speed requirement for the signal processing portion of ADSL also results in less flexible, high component costs.

Fourth, requiring a communications device (such as a modem) to fully support the total throughput of a standard such as ADSL may be inefficient in some cases, since many prospective users of high-speed data links may not need to use all the available bandwidth provided by such standards. It is generally more preferable therefore to permit users to throttle or scale the data throughput in a manner they can control, based on their particular application needs, hardware cost budget, etc. For example, a full-scale ADSL system may have the performance level of 200 times conventional V.34 modems, but it is apparent that even a performance improvement of 10–20 times than present day available analog modems would be sufficient for many consumer applications, such as Internet access and similar uses. Thus, unlike conventional analog modems, which are available in various speeds varying generally from 14.4 to 56 Kbps, there are no known ADSL modems which offer scalable performance levels to users.

Fifth, in addition to the implementation challenge, the T1E1.4 ADSL standard does not specify the system interface and user model. Although various high level interface to support T1/E1, ATM, etc. have been described, system integration with high level protocols such as TCP/IP and interface with computer operating systems have not yet been defined. As a result, there is uncertainty how existing and future modem-based applications can work with the ADSL technology. For example, when users run an Internet application which sends and receives data to and from an Internet service provider (ISP), a mutually agreed protocol is required to set up a call and transfer data. Possible protocols available at various levels include ATM (asynchronous transfer mode), TCP/IP, ISDN, and current modem AT commands. Either one of these or a possibly new protocol needs to be defined to facilitate the adoption of ADSL technology.

SUMMARY OF THE INVENTION

An object of the present invention therefore is to provide a communications system which is fully compatible with high speed, rate adaptable protocols such as are used with ADSL, but which system is nevertheless implementable with simpler analog front end receiving/transmitting circuitry and is thus reduced in cost and complexity;

A further object of the present invention is to provide a communications system which is fully compatible with high speed, rate adaptable modulation protocols such as used with ADSL, but which system is nevertheless implementable with simpler digital signal processing circuitry and is thus reduced in cost and complexity;

Another objective of the present invention is to provide a method for transmitting data within a fractional, desirable portion of available bandwidth in a channel by modulating only a limited number of desirable sub-channel data carriers, so that a high speed data link can be achieved that is faster, and has reduced computation and hardware demands;

Yet a further objective of the present invention is to provide a communications system with smaller peak-to-peak deviation in the sub-channels signals, so as to reduce the dynamic range required for the front end ADC, and to minimize quantization errors.

Another objective of the present invention is to provide a high speed communications system having a data throughput that is easily controllable and expandable, so that the performance range of such system can be configured to any fractional percentage of total bandwidth available in a transmission channel, up to and including full bandwidth use of the channel;

A related objective of the present invention is to provide a high speed communications system that is modular so that forward compatible and expandable functionality can be incorporated flexibly and with a minimum of effort on the part of a user of such system;

Yet a further objective is to provide a system that is compatible with high speed protocols used in ADSL, but which is also easily adaptable to support preexisting high level data protocols, including those presently used for controlling high speed voice band modems;

A further object of the present invention is to provide a high speed communications system that self-calibrates its own performance level, based on the processing power available to such system;

Another objective of the present invention is to provide a high speed communications system that permits a user to configure the performance parameters of such system using conventional personal computer hardware, software and operating systems;

A further object of the present invention is to provide an interface between a host operating system and a high speed communications system that provide forward compatible and expandable functionality;

An additional aim of the present invention is to provide an improved system for concurrent control of conventional voice data traffic on a POTS channel, and upstream/ downstream communications on separate sub-channels;

These objects and others are accomplished by providing a communications system that permits a host processing device to receive selected data within a narrow bandwidth from an upstream transciever which can and normally transmits a large bandwidth analog data transmission signal through a connected channel. A channel interface circuit AFE samples the received analog signal to generate a digital signal. Only a limited portion of the bandwidth may be sampled, thus reducing front end complexity. A digital signal processing circuit then extracts the selected data from this limited digital signal, which is significantly easier to process than a full bandwidth digital signal. Feedback information is provided back to the upstream transmitter which causes the upstream transmitter to transmit downstream data thereafter only using the limited bandwidth of the front end, and not the full bandwidth. This feedback information contains information about the channel that suggests to the upstream transmitter that the other bandwidth in the channel is unusable. In this manner, the upstream transceiver is trained to accommodate the lower rate downstream transceiver in a manner that nevertheless preserves protocol integrity.

In a preferred embodiment, the large bandwidth analog data transmission signal is comprised of a number of DMT modulated sub-channels, and an anti-aliasing filter on the front end of the the downstream transceiver ensures that only a limited number of such sub-channels are processed by a DMT signal processing core. The feedback information consists of non-zero SNR information for the selected sub-channels, and a sub-channel blackout "mask" to eliminate the potential use of other sub-channels. The feedback information is sent by way of a front end transmitting circuit which transmits an upstream data transmission using a second frequency range different from the downstream transmission.

One implementation of the aforementioned high speed system is in a personal computer, so that the signal processing can be accomplished using a processor within such computer, which in a preferred embodiment is an X86 compatible processor. Another implementation of the aforementioned high speed system uses a dedicated signal processor for demodulating the selected sub-channels. This cuts down on processing overhead requirements for a host processing system incorporating the system. In such implementations the portion of the downstream data transmission to be processed for data extraction can be configured by a user of such systems, or alternatively, it can be dynamically determined based on an evaluation by the digital signal processing circuit of performance characteristics of different portions of the frequency spectrum within the bandwidth potential of the upstream transceiver.

In another variation, the data rate of a system such as described above can be increased by processing data from an additional second limited frequency bandwidth portion of the total available downstream bandwidth. In a preferred embodiment, this can be done by including a number of anti-aliasing filters in a modular bank as part of the analog front end section, each of which passes a different frequency bandwidth portion. By making the analog front end modular, the data rate of the overall system can be scaled in a controllable and cost-effective fashion. At the same time, each analog front end portion can be operated at a slower sampling clock and smaller dynamic range. This results in a more relaxed speed requirement and smaller quantization noise at a given number of bits per sample.

The present disclosure also includes an interface to an operating system, to facilitate controlling the high speed communications system when it is incorporated in a personal computer system. This interface ensures that the operating system treats such communications system essentially the same as other prior art voice band modems, and in a preferred embodiment, is a device driver for the Windows NT operating shell. Finally, the present disclosure also describes an applications program which permits a user of a personal computer to control the performance characteristics of the high speed communications system by setting certain system parameters when such system is incorporated in a personal computer system. This program includes an auto calibration routine for setting such system parameters, or alternatively a user of such program can tailor the settings subject to confirmation of the efficacy of such settings based on an evaluation of the processing power available to such user.

Although the inventions are described below in a preferred embodiment implementing the ADSL standard, it will be apparent to those skilled in the art the present invention would be beneficially used in any high speed rate-adaptable applications.

It should be noted that while some prior art devices also have limited mechanisms for achieving a reduction of nominal or peak transmission speed in a channel, they only activate or implement such mechanisms as a fallback response to a failure in the channel, or because of a transmission rate reduction in the upstream transceiver. Unlike the present invention, such prior art modems, during an initialization process, attempt to establish the highest possible transmission rate achievable by the channel and the upstream transciever. In other words, any rate reduction imposed by the downstream modem is typically considered an unintended and undesirable side effect of bad channel characteristics, and not a desirable and intentional design target as set forth in the present invention. In addition, the data rate reduction in such modems is accomplished primarily by varying the number of bits per baud (hertz) at a fixed frequency, and not by controlling the overall frequency spectrum of the downstream data transmission. Moreover, in such prior art systems, no effort is made to measure, identify or use an optimal portion of the usable bandwidth or set of transmission sub-channels. Instead, such prior art systems typically use whatever available bandwidth or sub-channels happen to be usable at that instant in time.

Similarly, while a fixed 300 baud rate downstream modem can work with an upstream 33kbs rate modem this arrangement is also unlike the present invention. This is because, again, the bandwidth reduction in such prior art device is so large that it is considered commercially unusable by today's standards. Furthermore, the smaller bandwidth modem is not compatible with, and does not support, the higher protocols of the higher bandwidth modem, which is also undesirable from an implementation standpoint. Stated another way, unlike the present invention, the lower end modem limitations of prior art system force the data link to be set up using a low level protocol that does not take advantage of the full capabilities of more advanced protocols.

Finally, there is no mechanism for users of either of the prior art systems noted above to expand the functionality of such modems in a controlled, flexible, and modular manner.

BRIEF DESCRIPTION OF THE DRAWINGS

FIG. 2 is a block diagram of a general implementation of a communications system employing the present invention, adapted for use in an ADSL environment;

DETAILED DESCRIPTION OF THE INVENTION

Figure 1:
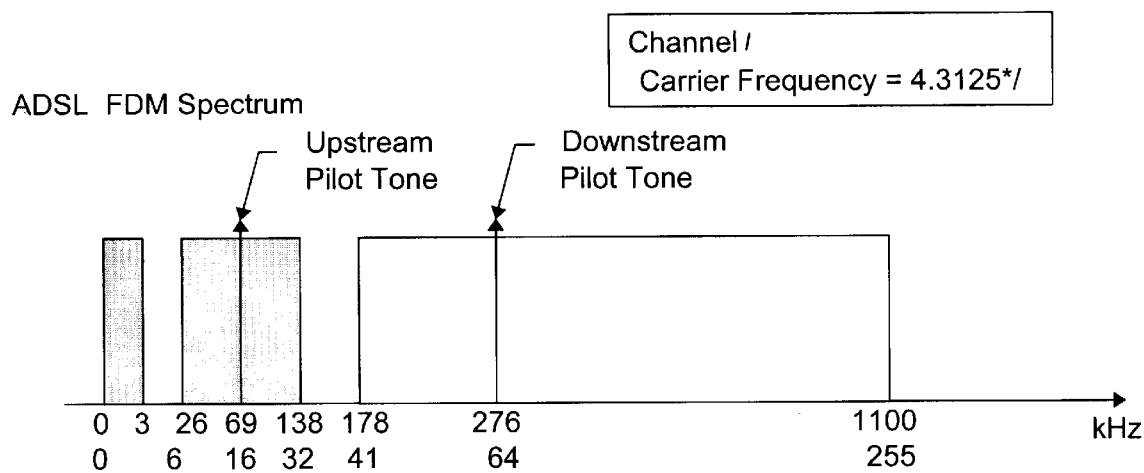
FIG. 1 is a pictorial depiction of the ADSL/DMT bandwidth allocation for upstream and downstream data in a channel based on frequency division multiplexing (FDM) configuration.

While some of the concepts set forth immediately below are well-known, a brief explanation of ADSL technology is provided with reference to FIG. 1 to facilitate an understanding of the present invention. As explained above, it is well-known in the art to use DMT to effectuate the ADSL standard. In contrast to most modulation schemes, such as AM/FM transmissions that use one carrier, DMT uses multiple carriers to transmit data bits. Specifically, T1E1.4 ADSL standards specify an up to 255 channels for downstream transmission from the central office to subscribers and up to 31 channels for upstream transmission from subscribers to the central office. As shown in FIG. 1, each carrier has a bandwidth of 4.3125 kHz. The total bandwidth is 1.1 MHz for a total of 255 channels. In the upstream direction, a "pilot" tone in the approximate range of 69 kHz, is used for maintaining timing synchronization. A similar pilot tone is transmitted in the downstream direction in the vicinity of 276 kHz.

Since upstream and downstream transmissions are over the same 2-pair twisted wire, they need to be separated by either echo cancellation (EC) or frequency division multiplexing (FDM). Echo cancellation allows simultaneous transmissions in both directions but requires a complex echo canceler implementation. On the other hand, FDM uses two different frequency bands for separate downstream and upstream transmissions. As shown in FIG. 1, the upstream transmission uses subchannels from channel number 6 to 31, and the downstream transmission uses subchannels from channel number 41 to 255. While the remainder of the discussion below focuses on an system employing FDM, it will be appreciated by those skilled in the art that the present invention is adaptable and can be used beneficially with echo-cancellation approaches as well.

As with most communication environments, the transmission bit rates for both upstream and downstream communications in ADSL are not fixed but instead are determined by the quality of the channel. In the present invention, a number of well-known techniques can be used advantageously for setting up the initial data link. In general, these techniques work as follows: during initialization, the channel quality is measured and a certain data rate (typically a number of bits) is assigned for each DMT subchannel; thereafter, a "handshaking" process is used to dynamically and adaptively change the bit loadings (and energy levels). The latter is often necessary because (among other things) changes may occur in the overall channel characteristics, changes in the target bit rate may be needed, or new bit distributions in the sub-channels may be required because of degradations in one of the sub-channels.

The quality of the sub-channel response can be measured by the received signal to noise (SNR) ratio. According to the Shannon theorem, the upper limit of the number of bits per unit Hz that can be transmitted is $\log_2(1+SNR)$. Therefore, by measuring the received SNR at the receiver end, one can determine the number of bits allocated for each subchannel modulation. The total data throughput rate achieved by the system, therefore, is simply the sum of all the data rates of all the usable subchannels.

According to the T1E1.4 ADSL standards, data bits are grouped and processed every 250 $\mu$sec. The number of bits that can be processed over one such time frame is the summation of the bits allocated for each subchannel determined from the previous channel response measurement. For a given number of bits assigned to a certain subchannel, quadrature amplitude modulation (QAM) is used to convert bits to a complex value, which is then modulated by the subchannel carrier at the corresponding frequency.

The above is a merely a brief summary of the general operation of a typical DMT/ADSL communications system. The general circuits used in prior art ADSL systems, the specifics of the bit/energy loading process for the sub-channels, the bit fine tuning process, and the details of the modulation of the sub-channels, are well-known in the art, and will not be discussed at length herein except where such structures or procedures have been modified in accordance with the teachings herein.

The full downstream data throughput of a typical prior art ADSL standard transceiver approaches 6 Mbps, which is more than 200 times the speed of conventional analog modem technology. This requirement was imposed since a large part of the initial motivation to implement ADSL was to achieve high speed multimedia communications and video teleconferencing. Nevertheless, a large number of potential users do not want or need to have such wide bandwidth capability. For example, many potential users of ADSL (or similar high speed loops), including many who are intending to use such links primarily for Internet access, only need to achieve downstream transmission speeds that are in the hundreds of kilobits per second range. This data rate is in fact achievable using only a fraction of the available bandwidth of ADSL. By processing only a fraction of the available bandwidth of the ADSL standard, the present invention permits a limited but extremely useful ADSL modem to be implemented with significantly less expense and complexity than previously possible. At the same time, because the present invention has modular characteristics, the proposed implementation of the present invention affords users an easy path to forward and upward expansion of the overall functionality of their system.

Figure 1B:
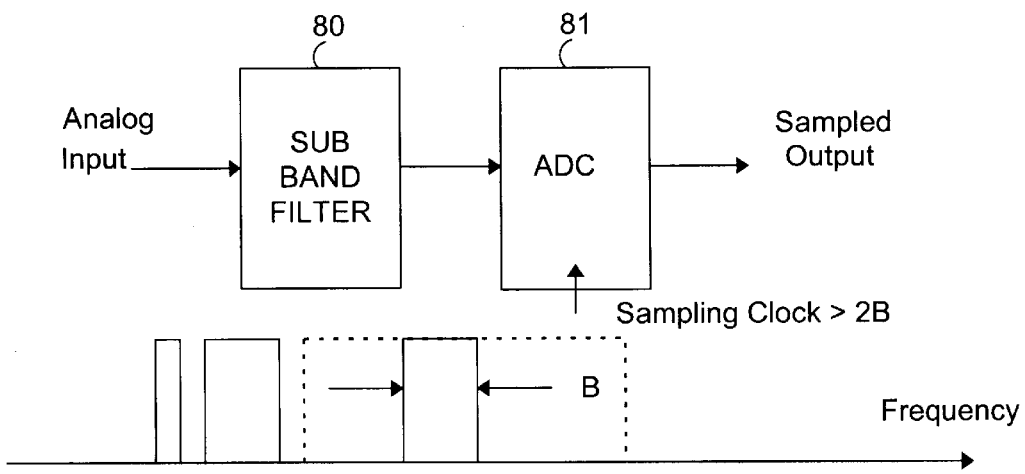
FIG. 1B shows the relationship between a sub-band filter and an analog to digital converter that can be used in an analog front end (AFE) of the present invention.

The principle behind this aspect of the present invention is as follows: As shown in FIG. 1B, if the transmission in the channel is restricted to a smaller bandwidth by an anti-aliasing filter 80, according to the Nyquist sampling theorem, the sampling rate of AFE devices (such as ADC 81) that perform analog to digital conversion can be significantly reduced. Specifically, if the total downstream bandwidth is limited to some fractional total B Hz (in a preferred embodiment using DMT in an ADSL environment, B=20 DMT channels or about 86 kHz) as shown below, we can limit the Nyquist sampling rate to around 180 kHz. This is achievable with ADCs having greatly simplified hardware and reduced performance requirements, in contrast to the full ADSL bandwidth approach, which processes 200 DMT channels or 900 kHz in the case of full ADSL implementation.

The total accumulated bit rate of an ADSL communications system using the present invention can be calculated as follows. Suppose a total number of k subchannels (out of a total of M possible) are to be supported and each channel is allocated $b_k$ bits for transmission. The total accumulated bit rate (R) is:

$$R = (\Sigma_{i=1,k} b_i) * 4 \text{ kHz (bits/sec)}$$

where 4 kHz is the framing rate defined by T1E1.4 ADSL standards. If k=20 channels and the average number of bits per channel is 6, then total bit rate (R) is approximately 480 kbits/sec. It can be seen that this fractional use of the ADSL bandwidth nevertheless provides about 9 times the performance of a conventional analog 56 kbits/sec digital modem. The benefits of this approach of the present invention are apparent. The overall performance and cost of a high speed communications system can be scaled and controlled in direct relationship to the particular needs of particular users. In general, the data rate supportable by (and the relative cost of) any particular implementation of the present invention is generally determined by two factors: (1) the capacity of the AFE; and (2) the capacity of the hardware performing the DMT.

The capacity of an AFE is generally measured by the maximum sampling speed it can achieve. As explained above, the sampling speed in turn determines the upper limit of the frequency band B (in kHz) that can be obtained. At the defined channel separation of 4.3125 kHz for ADSL, the total number of subchannels that can be supported is less than or equal to B/4.1325. A suitable ADC can be selected, therefore, based on the particular data rate and cost requirements of any particular user.

The other factor that limits the number of subchannels (and achievable data rate) is the processing power available for DMT modulation and demodulation routines. For example, a variety of performance levels (achievable data rates) are possible with well-known dedicated signal processing hardware, such as digital signal processors, as discussed in more detail below with reference to FIG. 2. Alternatively, as shown in FIG. 3, if such routines are implemented primarily by software and run by a host CPU, the required processing power (MIPS) generally increases directly as function of the number of subchannels that need to be processed. This is because, in general, most of the processings are done in serial, or a channel by channel basis. As discussed below in more detail, the present invention makes use of a "calibration" routine for estimating the total available processing power of a user's computing system in order to set an upper limit of the total subchannels that can be supported.

Figure 1C:
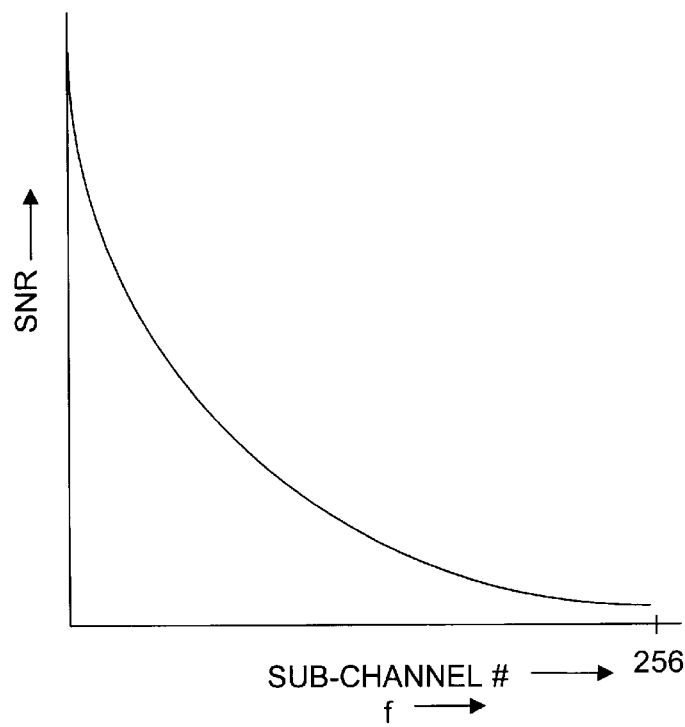
FIG. 1C is a pictorial depiction of a SNR curve for a typical subscriber loop channel using sub-channel modulation.

Irrespective of the selection of the particular AFE or signal processing technique used, however, another useful (but not essential) aspect of the present invention is that the sub-channels with the largest signal to noise ratio (SNR) within the passband are selected for data transmission. In other words, in the preferred embodiment of the present invention, those k subchannels within the passband that support the largest number of bits are used for processing. As seen in FIG. 1C, for example, a standard two-wire subscriber line typically has a SNR curve that exhibits extensive attenuation with higher frequencies. It can be seen roughly in this figure that while there are more than 200 sub-channels provided for downstream transmission in ADSL, it is typically the case that 50% of the maximum data rate can be accomplished using only a much smaller percentage (than 50%) of the sub-channels. This fact is especially useful in considering some of the shared/multi-channel bandwidth embodiments discussed further below.

The present invention, therefore, permits an implementation for a high speed data communications system that makes use of the best portion of the channel, while still being upwardly compatible and forward expandable. By these terms, it is meant that a system constructed in accordance with the teachings herein is completely compatible with a fully implemented version ADSL DMT modem. Moreover, it will be apparent to those skilled in the art that appropriate modifications specific to the channel and data link protocols and standards can be made so that the present invention can be advantageously employed in non-ADSL environments as well. Upward compatibility and forward expandability refer to the fact that systems constructed with the present teachings can have data rates that are easily upgraded while still preserving and maintaining compatibility with existing standards. For example, lower end users desiring less bandwidth can achieve a satisfactory performance with a minimum of cost, and can then upgrade the performance levels of their systems at later time by suitable (and preferably modular) upgrades of the AFE and signal processing hardware/software.

A system constructed in accordance with the present teachings is completely compatible with the full ADSL standard because of the following two aspects: According to the rate adaptation feature specified by the T1E1.4 ADSL standards, the bit rate for each sub-channel is determined initially (and preferably dynamically on an ongoing basis) by the sub-channel SNR analysis. Specifically, an ADSL downstream receiver can inform an upstream ADSL transmitter about the quality of the transmission; the receiver can also decide the bit rate for each sub-channel. Therefore, a downstream, partial-channel bandwidth receiver using the present invention can (based on the speed and passband of such receiver) supply an upstream, full-standard ADSL transmitter with information or control signals to effectuate a transmission only in selected sub-channels. In particular, in a preferred embodiment, the upstream ADSL transmitter is provided with SNR information for sub-channels outside the passband that is artificially contrived so as to suggest to the upstream transmitter that these sub-channels are not usable. In this manner, the downstream transmission is limited to a certain number of subchannels within the AFE and signal processing capabilities of the receiver. It can be seen, nevertheless, that this scheme is completely transparent to the transmitter, thereby permitting a system built in accordance with the present teachings to be fully compatible with the ADSL standard. While not possible at this time within the ADSL standard, it is apparent that other high-speed data protocols may use a control signal, instead, to provide for express limiting and control of the identity of the sub-channels transmitting information.

As the technology improves for AFE devices and DMT implementation, the number of subchannels supported by a system using the present invention can increase. As a result, such systems can upgrade completely to a full T1E1.4 ADSL implementation using a single higher end modular replacement AFE devices, or alternatively, a number of lower end modular AFE devices.

General Embodiment of Present Invention

The basic structure of the present invention is depicted generally in FIG. 2. In general, the present invention can be embodied in different combinations of hardware and software. The primary difference between these embodiments is the specific implementation of the DMT core. These specific embodiments are described in more detail below with reference to FIGS. 3A and 3B.

The structure and operation of ADSL transceivers is well-known in the art, and for that reason the present description primarily details those aspects of such transceivers which are necessary to an understanding of the inventions herein. As seen in FIG. 2, a channel 100 is made of a regular copper wire "loop", and each such loop may have differing electrical properties, transmission lengths (sizes), varying attenuation characteristics, and a number of impairments or interferences. Splitter 210, a conventional and well-known circuit, separates a DMT signal occupying more than 200 sub-channels from a lower end 4 kHz POTS analog signal. The latter can be used for simultaneous voice or conventional analog modem. Hybrid circuit 220 is also well-known in the art, and consists primarily of conventional transformers and isolation circuitry used in a wide variety of high-speed devices interfacing to standard telephone lines. A ring detect logic circuit 290 can also be implemented using accepted techniques, to alert a Control Interface 295 to the existence of a transmission signal originating from an upstream transceiver (not shown).

The full bandwidth signal is either low passed or bandpass limited to a frequency width B by suitable, well-known techniques as it passes through bandpass Filter and Analog/Digital Converter 280, so that only a fraction of the signal in the frequency domain is passed on to Buffer and DMT Receive Core 260. Again, the only important consideration for Subband Filter 280 is that it must constrain the bandwidth of the incoming signal to be $\leq B$, where the sampling rate of the Analog/Digital Converter is $\geq 2B$. This can be accomplished by using well-known filter designs. By suitable selection of circuitry for Filter and ADC 280, the overall system cost and performance can be scaled accordingly. In a preferred embodiment, the signal passed through Filter and ADC 280 occupies a spectrum between approximately 200 and 400 kHz. This selection is based primarily on an expected average performance of a typical two-wire line. It will be apparent to those skilled in the art that different bandpass widths and regions may be more suitable or optimal for other kinds of data links, or other kinds of multi-carrier modulation schemes.

Moreover, in some instances, while it is somewhat more expensive to implement, an adaptive or tunable filter may be substituted, such that the target frequencies of the passband are adjustable uniquely for each new data link. In such cases, the bandpass can be configured to coincide with the sub-channels having the highest achievable SNR, including the subchannels that must be supported for protocol or other system overhead reasons. Also, in some applications, the analog-to-digital conversion may be performed by a digital signal processor, or by the host computer and therefore, the sampling rate can be dynamically controlled and matched to the bandpass target frequency and frequency breadth. This feature, in turn, would assist dynamic scaling of the data throughput based on system computing power and overhead requirements.

Furthermore, in this preferred embodiment, using a multi-carrier approach implementation for ADSL, a pilot tone at 276 kHz must be allowed within the passband. It is apparent that other protocols may require similar pilot tones, and the design of comparable filters to achieve the functionality of Filter and ADC 280 is well within the ordinary skill of one in the art.

DMT Receiver Core 260 is generally responsible for monitoring and measuring the SNR of the sub-channels falling within the frequency range passed by FILTER and ADC 280, and for extracting the original data stream from the numerous sub-carriers. In a preferred embodiment, Control Interface 295 receives system configuration information from a host 298. This information may contain such parameters as target throughput rate R, target error rate, target center frequencies F for FILTER and ADC 280, target frequency width B, etc. By evaluating the SNR and bit capacities of the sub-channels computed by DMT Receiver Core 260, and taking into consideration the target data rate R, Control Interface 295 can select a number k of sub-channels up to and including the total available number M of sub-channels to carry the data stream from the upstream transmitter (not shown). The number of sub-channels that can be used for carrying data is directly related to the bandpass frequency B as described above. In a preferred embodiment, M=200+(ADSL) and Control Interface 295 will usually configure k=20.

For every sub-channel other than the selected k sub-channels, a "mask" or blackout control/feedback signal is generated and transmitted by DMT Tx Core 250, Buffer 240 and DAC 230 to the upstream transceiver. This ensures that any subsequent data transmissions by the upstream transceiver only use the selected k sub-channels. This feedback information is provided, therefore, irrespective of the transmitting capacity of the upstream transceiver, and even during times when the channel 100 is capable of supporting more than k sub-channels. In this manner, the present system is perceived by upstream transceiver to be compatible with protocols and performance characteristics of the upstream transceiver, because the upstream transmitter receives feedback information indicating merely that the two systems are connected through a channel with substantial signal attenuation characteristics for data signals outside the k sub-channels. Based on the inherent rate adaptiveness of ADSL and other similar protocols, the upstream transceiver will automatically train itself to use only the k sub-channels predetermined by the downstream transceiver. It should be noted that the DAC 230 and Buffer 240 in the front end transmitting circuit preferably transmit any upstream data transmissions using a second frequency bandwidth different from that of the downstream data transmission. However, this is not necessary in systems using echo-cancellation. Furthermore, in ADSL applications, the size of this bandwidth is considerably smaller, and uses only L sub-channels, where L<M. In other xDSL applications, L may be on the same order or larger than M.

Again, while the ADSL standard fixes the data error rate to be $10^{-7}$, it is conceivable that other applications of the present invention may tolerate a reduced error rate. For example, if maximum data throughput is required (i.e., the margin is less constrained) then the largest bit capacity sub-channels within B can be selected. Alternatively, if the system is error-performance driven and has more relaxed throughput requirements, than the 20 subchannels with the best margin are selected. A suitable combination of sub-channels can be selected by one skilled in the art based on the particular system requirements which may vary from application to application. Moreover, Controller Interface 295 may optimize the desired sub-channel mix dynamically depending on the type of data transmitted in channel 100. For example, streaming audio or video, or pictorial graphics, may require less integrity and error performance than other kinds of data used by n applications programs running on host 298. The specifics of the structure, operations and techniques used by Controller Interface 295 are not constrained by any requirements of the present invention, and can be implemented in various ways well-known to those skilled in the art.

The operation of the remainder of the circuitry shown in FIG. 2 is also relatively straightforward and not unlike a typical multi-carrier modulation system. Control Interface 295 ensures that DMT Transmit Core 250 performs bit and energy loading only for those sub-carriers necessary to effectuate a selected host throughput rate/error rate combination. As with the circuitry used for Filter ADC 280, the circuitry for performing the functions of DAC 230 can be implemented in programmable form to allow for greater flexibility.

Finally, while not presently supported in ADSL protocols, it is nevertheless possible that the filter in block 280 can be eliminated entirely in some applications when the sub-channel or downstream transmission frequencies can be configured through appropriate handshaking or similar procedures. In other words, if the upstream transmitter can be configured to transmit using only a portion of the bandwidth available in the channel, the advantages of the present invention can still be realized, because the ADC portion of block 280 can still be relatively less complex, since it will be processing at a much slower sampling rate than that required for a full spectrum implementation. Moreover, such an implementation would also yield the same commensurate savings in the DMT processing core, and reduced quantization errors.

Some special features of the present invention include the fact that:
(i) unlike hardware architectures implementing a full T1E1.4 ADSL standard, the present invention uses a filter in the front end. As mentioned earlier, the use of this filter is to allow low speed sampling by the ADC. If suitable handshaking between the upstream and downstream transcievers can be effectuated to generate a reduced downtstream transmission, the filter can be eliminated.
(ii) standard ring detection logic is incorporated to support existing modem features;
(iii) DMT Rx core 260 is basically implemented the same way as specified by T1E1.4, but with some important differences, specifically:
  [a] due to subband filtering and lower speed sampling, the frequency channels at the output of FFT (not shown) in the DMT Rx Core have a frequency shift
  [b] Since not all 256 subchannels are necessarily supported by the DMT Rx Core 260, actual FFT implementation can be smaller, simpler and more cost-effective;
(iv) Control logic 295 permits the system to behave essentially like a conventional analog modem, and is used to support necessary setup tasks such as dialing and handshaking;
(v) The use of limited bandwidth from the downstream channel reduces the need for echo-cancellation circuitry, because there is less need for overlap between the upstream and downstream transmissions, and this further reduces system complexity and cost;
(vi) Because a smaller portion of the spectrum is processed by the present invention, the peak-to-peak deviation of the downstream signal is reduced, and this helps to minimize quantization errors.

Dedicated Hardware Based Embodiment

Figure 3A:
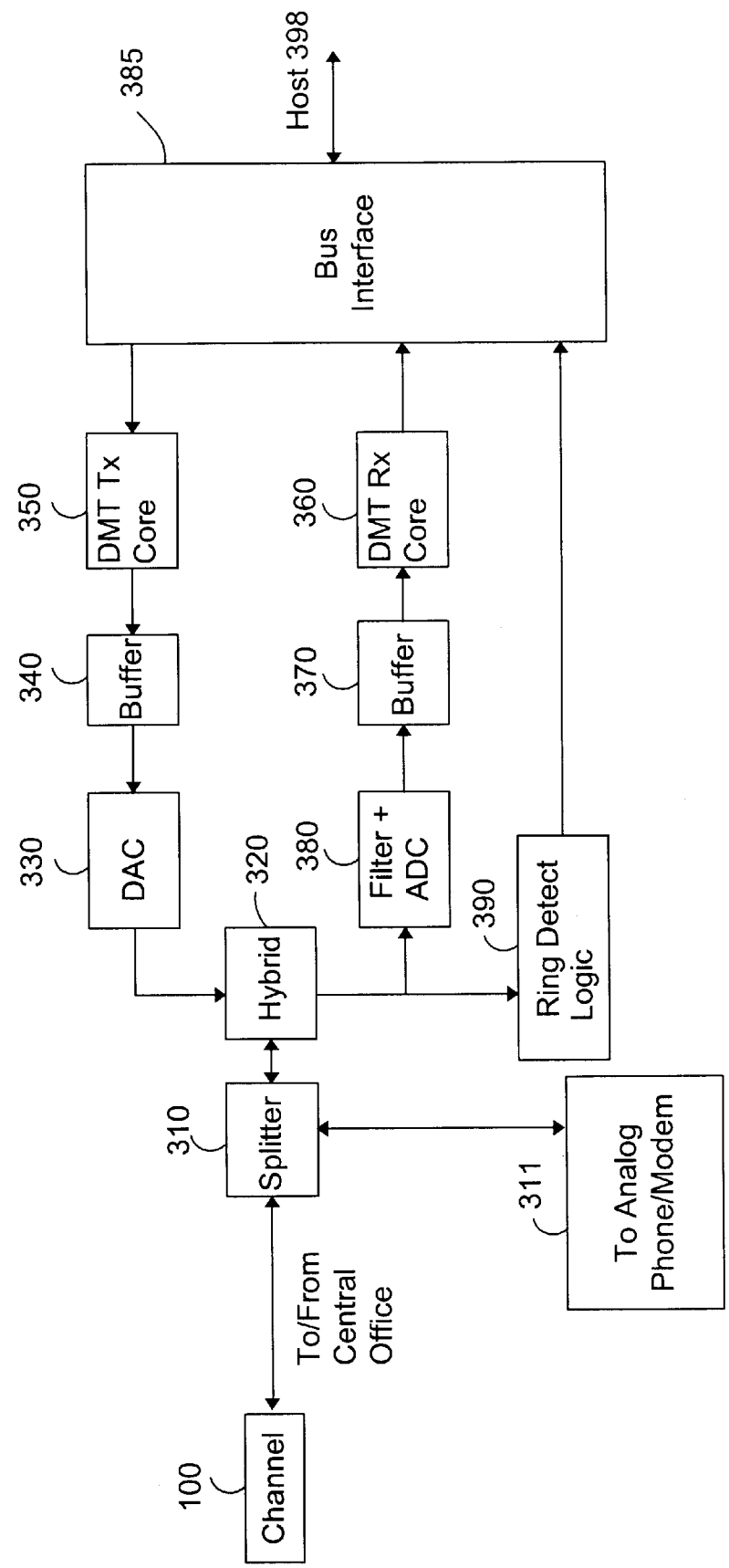
FIG. 3A is a block diagram of a dedicated hardware implementation of a communications system employing the present invention, also adapted for use in an ADSL environment.

FIG. 3A illustrates an embodiment of the present invention that can be generally described as a dedicated hardware implementation. For the present discussion of FIG. 3A, it can be assumed that those circuits having like numbered references are the same and/or perform the same function as their counterpart in FIG. 2. For example, unless otherwise indicated, there is no material difference between Splitter 210 (FIG. 2) and Splitter 310 (FIG. 3A).

In this embodiment, the DMT sub-channel modulation core is implemented completely in dedicated processing hardware. For this appliction, DMT Receiver Core 260 typically includes a digital signal processor (DSP) (not shown) and including on-board program ROM (or other suitable memory) for storing executable microcode routines for performing bit, energy and SNR measurements of the carriers in the sub-channels. In such an embodiment, due to the power of the DSP, there is typically no need for processing assistance from a user's host processor 398. This embodiment therefore may be advantageously employed where host processing power limitations are a consideration.

A user of a system shown in FIG. 3A can expand the functionality (i.e., data throughput rate and modem features) of such system by upgrading the DMT Receiver Core 260, and where necessary, the AFE 280 as well. The system of FIG. 3A can be incorporated on a typical printed circuit board. By mounting or packaging the circuits used in such blocks in an accessible fashion, they can be replaced or supplemented much in the same way present users of personal computers can upgrade their motherboards to include additional DRAM. One practical alternative, for example, would be to have multiple available slots to accommodate new subband pass filters for passing a greater portion of the downstream transmission to be processed by the DMT core logic. Other practical and simple variations of this approach will be apparent to those skilled in the art.

Partial Software Based Embodiment

Figure 3B:
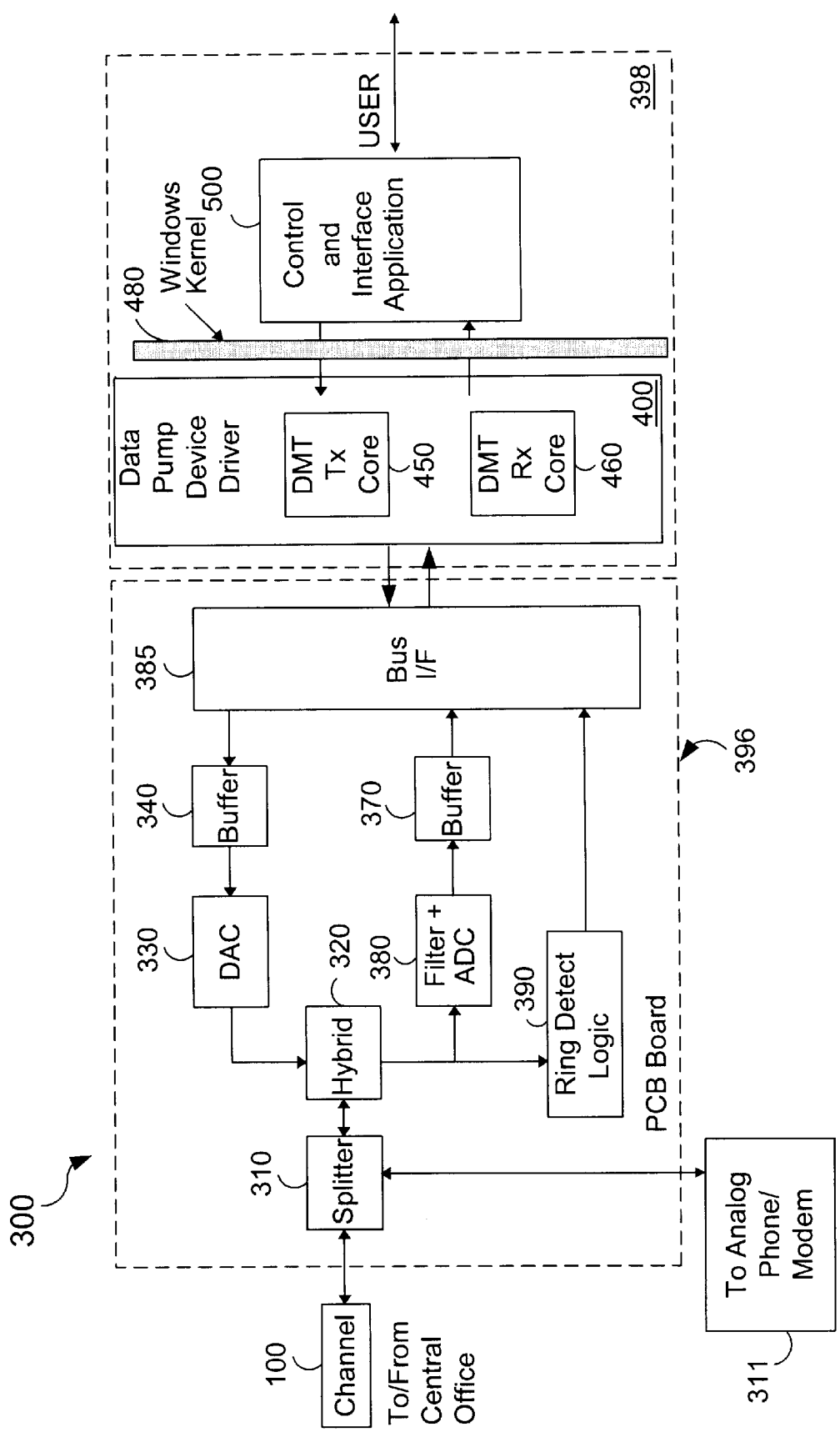
FIG. 3B is a block diagram of a mixed hardware and software based implementation of a communications system employing the present invention, also adapted for use in an ADSL environment.

In the above dedicated hardware embodiment, the overall speed (data throughput) can be maximized but with less flexibility for upgrades. This is because upgrades to such a system must take the form of hardware replacements, which can be more costly and difficult for the user to incorporate. On the other hand, as depicted in FIG. 3B, a number of important functions of a communications system can be completely implemented in software, in an analogous fashion to what is commonly described in the art as a "software" modem. In this case, the overall speed of the system depends on the user's processor power available at host 398, and only the AFE portion need be implemented in hardware.

The primary differences between the embodiments of FIGS. 3A and 3B are the following: (1) implementation of DMT modulation; (2) implementation of the control and handshaking functions; and (3) implementation of the control interface. As seen in FIG. 3B, DMT Receive Core 460 and DMT Transmit Core 450 are implemented in a data pump device driver by the host system 398. In a preferred embodiment, host system 398 includes some form of multi-purpose microprocessor (such as an x86 type processor) running a suitable operating system (such as Windows by Microsoft), and is capable of executing suitable low level drivers for the DMT modulation (FIG. 4), as well as high level application software for implementing Control Interface 500 (FIG. 5). Host processor system 398 communicates over a standard bus interface 385 (i.e., a PCI bus) to Front End circuitry 396 for implementing a high speed modem. As with the circuitry in conventional analog modems, this circuitry of the present invention can be effectively incorporated on a PC motherboard (i.e., Bus Interface 385 and Front End Circuitry 396 can be merged so that they are essentially part of host system 398) or on a separate printed circuit board, or as a stand-alone unit physically separated from host 398. While this approach may not provide as much throughput performance, it has the advantage of being less expensive than the pure hardware approach of FIG. 2, and much easier to upgrade.

In the "software" modem implementation of FIG. 3 using a typical PC running Windows, the DMT Tx core 450, Rx Core 460 and Control/Handshaking logic are implemented as a Windows Data Pump Device Driver 400, which consist of DMT routines, associated control and handshaking codes, and an interface to kernel 480.

Figure 4:
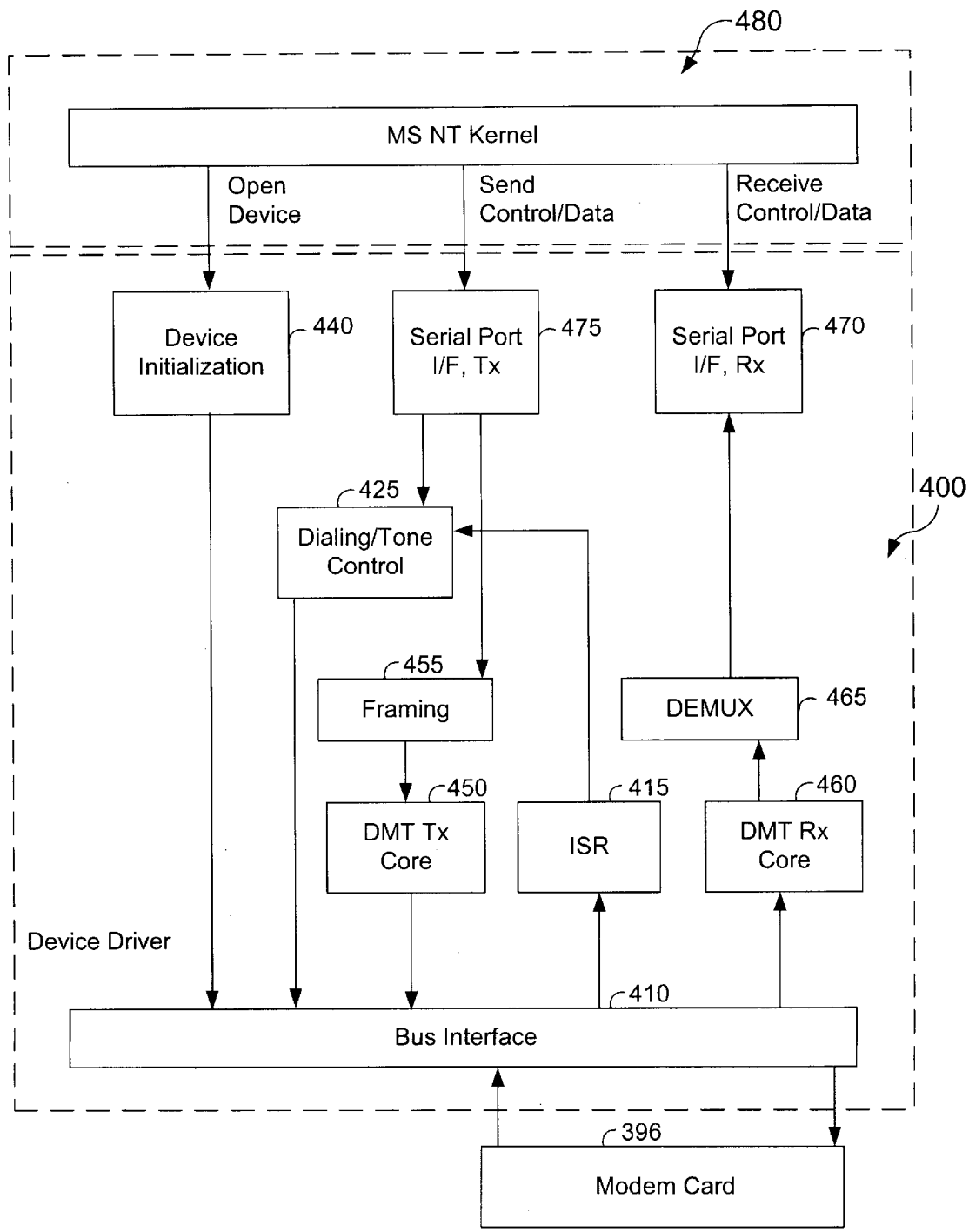
FIG. 4 is a block diagram depicting the general structure of the data pump device driver used in the mixed implementation shown in FIG. 3.
Figure 5:
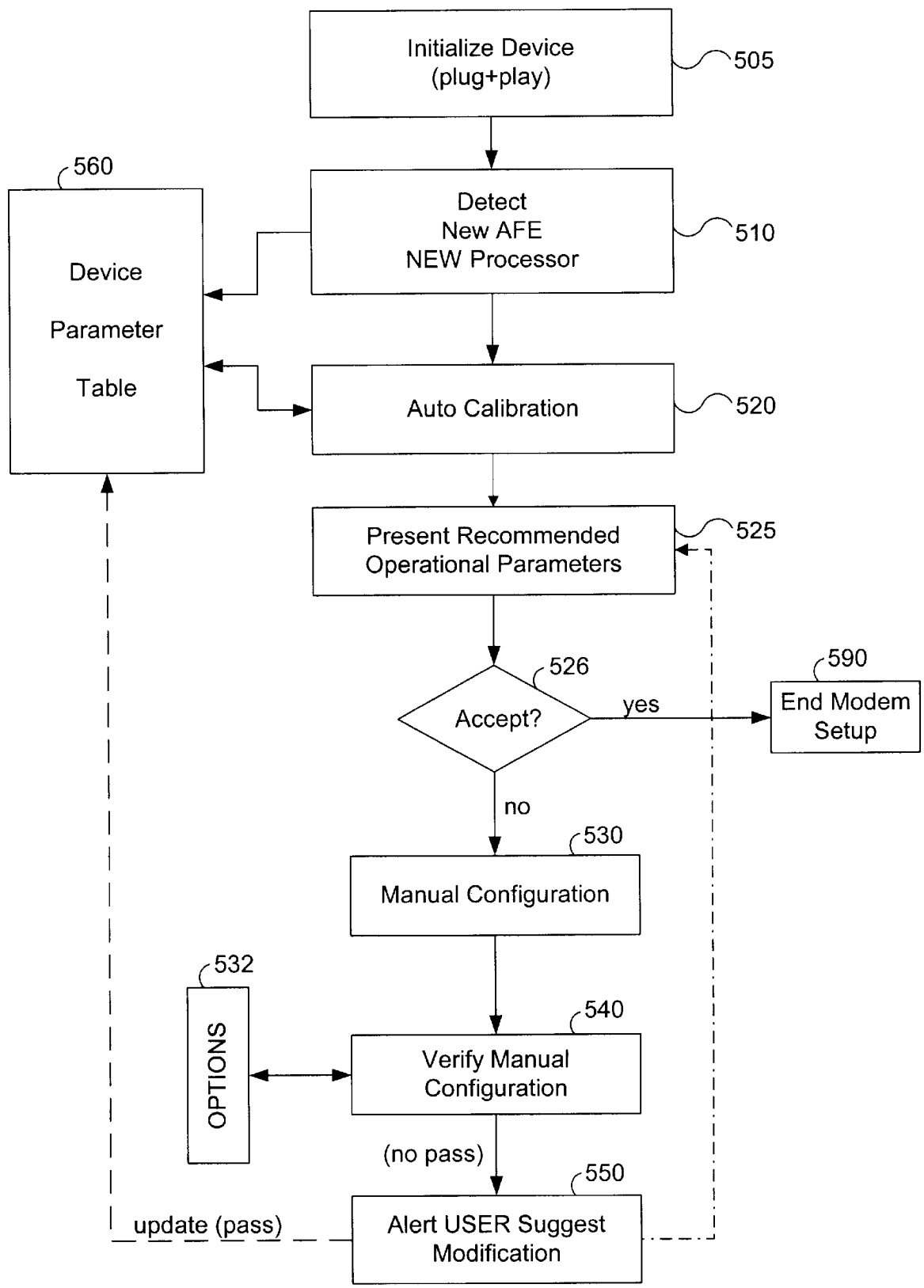
FIG. 5 is a flowchart depicting the general operation of the control and application interface used in the mixed implementation shown in FIG. 3.

A more detailed characterization of a portion of host processing system 398 is depicted in FIG. 4, which illustrates a preferred embodiment of a device driver 400 as it would be constituted for a computer operating system shell 480. In the present embodiment, Microsoft Windows NT is considered, but it is understood that other comparable environments may be used, including UNIX, Windows 95, etc. As is well-known, operating system 480 is responsible for supervising and controlling the operation of processing system 398 and all of its associated peripheral devices. Operating system 480 also includes various interactive control and graphical application interfaces (FIG. 5) for permitting a user of processing system 398 to run various applications programs, and to set up, control, configure, monitor and utilize peripheral devices such as disk drives, printers, monitors, modems and the like.

To assist operating system 480 to interact and control such peripheral devices, it is also well-known to use device drivers, which are essentially low-level hardware routines executed by a host processor and operating system. A device driver is a memory image file or executable file that contains all the code necessary to instruct a host processor to interface and drive a particular device within a computing system. Device driver 400 acts as an interface between an operating system 480 (in this case, Microsoft Windows NT) and hardware 396. In this case, for example, device driver 400 supports hardware 396 (see FIG. 3B), which is embodied in a typical printed circuit board (or external device). The teachings herein therefore provide for a new device driver that in combination with hardware 396 operates as a "software" modem. In this manner, operating system 480 classifies this combination as an ADSL modem, or in other words, another typical personal computer peripheral device, analogous to conventional voice-band modems.

Generally speaking, device driver 400 works as follows: a user of processing system 398 desiring to establish a data link to a remote site for transmitting/receiving data initiates such link through an application program (FIG. 5). Operating system 480 (FIG. 4) interprets and services this request by passing control of this task to device driver 400, which first generates appropriate instructions for a Device Initialization 440. In a preferred embodiment, Modem card 396 is initialized through Bus Interface 410 using conventional voice band modem control commands, so that the present invention is compatible with preexisting applications programs written for controlling modems using operating system 480. Similarly, therefore, control and data signals are interpreted and transmitted by operating system 480 to a Serial Port Interface 475 so that conventional modem dialing instructions and handshaking signals can be imparted to Modem Card 396 to establish a link through channel 100 to an upstream conventional ADSL transciever (not shown). As explained above, after suitable handshaking protocols have been completed, the upstream fully compatible ADSL transceiver will begin transmitting data on all available M usable sub-channels. This downstream data is filtered by FILTER/ADC 380 and at this time, information for only N sub-channels (N<=M) is temporarily held in Buffer 370. At or before this same time, an interrupt is generated by bus interface 385 and passed through device driver bus interface 410 to alert Interrupt Service Router 415 to the existence of downstream data requiring processing. Thereafter, DMT Receive Core 460 begins processing the downstream data stream in response to control information from ISR 415. A demultiplexer 465 extracts and correlates the data in the various sub-channels before passing it on to Serial Port Interface 470, and back to Operating System 480. In this manner, Device Driver 400 coordinates with Modem card 396 to effectuate a sofware modem whose performance is directly correlated to the computing power of a processor contained within the host processing device.

As mentioned earlier, Device Driver 400 also contains control information for configuring the number and selection of sub-channels to be used in the particular data link established through channel 100 with the upstream transciever during an initialization process. As also mentioned above, this control information may be self-determined by a user of host processing system 398, or alternatively, automatically sensed and monitored by such processing system, based on a computing performance rating for such system determined in a calibration routine. In either event, during the initialization process (and at all times subsequent) the upstream transceiver is induced to use such sub-channels only for the ensuing data transmission. This is accomplished by transmitting SNR information that is interpreted by the upstream transceiver as zero for all but $K \leq N$ of the sub-channels of the driver selection. This data is passed under control of Operating System 480 through Serial Port 475, Framing control 455 and DMT Transmit Core 450 before being sent out to Modem Card 396 and channel 100.

It is understood, of course, that ADSL Modem 396 can also respond to a request from a remote modem for initiating the data link. The process for initializing the link, nevertheless, is essentially the same as that described above. Device driver 400 can also contain control logic for supporting typical dial-up modem operations and control codes from conventional modem application programs typically implemented in voice-band modems, such as setting up Originate/Answer modes, monitoring call progress, performing modem diagnostics, configuring receive/transmit buffer sizes, supporting facsimile transmissions, as well as performing enhanced error control, data compression and flow control between Modem Card 396 and Operating System 480. Device Driver 400 can also support other conventional "always-on" data link connections as desired, such as may be found in typical ethernet network connections, and other dedicated applications.

Given the teachings of the present invention, the general design of the above Data Pump Device Driver 400 is a routine task well within the abilities of one skilled in the art. The specifics of such implementation are not critical or essential to the present inventions, and will vary from application to application according to system designer requirements, so they are not included here. Again, while this embodiment of the present invention is set out in the context of a PC based host processor running Windows, it will be apparent to those skilled in the art that above description is merely an exemplary implementation. The referenced DMT routines, associated control and handshaking codes can be employed in numerous host processing/operating system environments, and in a variety of different coding organizations (high level or low level processing forms) well-known in the art.

In the preferred embodiment implemented using a standard PC running Windows, Control/Application interface 500 includes Win32 codes which provide standard modem utility functions and interface with Data Pump Device Driver 400. In FIG. 5, a flowchart of the operation of the Control/Application Interface 500 can be seen, which interface is discussed in more detail below.

Another particularly beneficial aspect of the embodiment of FIG. 3B is the provision of a self-determining "performance" or calibration rating that can be used to determine an optimal or maximum data throughput rate. In other words, the system of FIG. 3B can automatically and adaptively configure a host system 398 to a particular throughput rate based on an evaluation of the available computing power. In a preferred embodiment, the performance rating is determined based on a calibration routine executed by Data Pump Device Driver 400. This routine sets a timer, and counts how many DMT frames can be processed within the given time; this gives a relative figure of merit for the particular host system in question. For each sub-channel to be added, one DMT frame needs to be processed within a small fraction of 250 μs. Therefore, by incrementally increasing the sub-channel count, the overall effect on total system processing overhead can be determined. Control/Application Interface 500 provides the user with control to set a threshold of available host power for implementing the high speed link. Based on this threshold of available power (which can be nominally set to 20%) the number of subchannels that can be supported can be gleaned very quickly.

In view of current technology, when DMT processing is implemented in software, the host processing power is more likely to be the limiting factor than the frequency band of the subband filter 80 in FIG. 1B. Nevertheless, because host processors (and especially microprocessors) are evolving in performance at a fairly rapid rate, the present invention affords users an opportunity to realize a high speed data link with performance that is controllable, and which improves whenever there is an upgrade in the host processing system. Since many typical present day personal computer systems have easily accessible and replaceable host processors, users of the present invention can easily and flexibly expand and enhance the throughput and functionality of an ADSL modem.

An example of the flow chart for an ADSL modem application/control program 500 designed in accordance with the present teachings is shown in FIG. 5. With the teachings herein, a user of host processing system 398 can, for the first time, dynamically control a forward compatible and expandable modem, such as an ADSL modem, using modem-control applications software that is analogous to that only previously available for voice band modems. In a preferred embodiment, ADSL Modem Card 396 is automatically detected by Operating System 480 and set up by initialization routine 505 by Modem Device Driver 400. A separate detection routine 510 determines whether or not ADSL Modem Card 396 has been upgraded with an additional AFE (as described generally with reference to FIG. 6 below), or alternatively whether a processor used in a host system has changed. The purpose of this step is primarily to determine whether entries in a Device Parameters Table 560 need to be updated because of changes in computing power, front end capabilities or other parameters that may necessitate a modification of the data throughput characterization of the overall system when used in a communications mode.

A calibration routine 520 is then executed to determine the nominal setup parameters for the overall system in the manner described earlier. The results from this operation are stored in Device Paramater Table 560 where they then become accessible to various application programs that may make use of ADSL Modem Card 396 and Device Driver 400. The information stored in table 560 can include any or all of the following: (a) measurements of the computing power available to the host processor; (b) measurements of the number of frames processable by the system within a particular time period; (c) estimations of the expected loading on the processing system based on demands of other applications programs and peripheral devices; (d) minimum and maximum data throughput estimations and/or targets; (e) data identifying the type of host processor; (f) data identifying the number and type of AFEs in ADSL Modem card 396; (g) estimations and/or target system loading rates available for a datalink (i.e., maximum available processing time to be used by the system during data transmission); (h) data transmit and receive buffer sizes; (i) interrupt or similar priority data for the modem card; (j) estimations and/or target system sub-channel utilization; (k) estimations and/or target system sub-channel bit capacity information; etc. It will be apparent to skilled artisans that the above are just examples of the types of information that may be pertinent to the performance of a high speed communications system, and that other parameters may be considered depending on the environment, application, etc. in which the present invention is used.

After performing Auto Calibration routine 520, the results of the same are presented to the user for acceptance and verification at step 525. At this point, the user can accept the predetermined configuration data at step 526 (i.e., such as proposed maximum and minimum throughput rates, loading rates, etc.) and this would otherwise invoke an end of modem setup routine 590. Should the user not want to accept the recommended parameters, a Manual Configuration routine 530 is executed. At this juncture, various system performance data can be presented to the user for review, along with a list of modifiable system options 532. If for example, the user elects to increase the desired throughput rate, a Verification routine 540 is then executed to determine whether such rate is reasonably sustainable within the other parameters of the system. If the new proposed configuration data is otherwise acceptable, then the Device Parameter Table 560 is updated, and the setup routine again ends. Otherwise, the user is alerted by a Notification/Suggestion routine 550, which points out the failure of the proposed configuration, and, if possible, makes suggestions to the user for modifying the system options 532 so that overall compliance can be achieved within the performance capability of the host processing system. The program then loops back to Acceptance routine 525, and thereafter the process is repeated until an acceptable configuration has been achieved, and any changes have been incorporated into Device Parameter Table 560.

While some of the operational steps above are described as implemented solely by Operating system 480 and Device Driver 400, it is understood that such operations occur under direction of modem applications program 500, or in some cases, based on initialization routines executed by the host processing system. Moreover, to simplify the presentation of the present invention, only some of the features that may be implemented are described above, and many other well-known operational steps normally associated with setting up or monitoring modems are omitted.

As with the design of the above Data Pump Device Driver 400, the general design of the Control/Application Interface 500 required to accomplish the above functions is a routine task well within the abilities of one skilled in the art given the teachings herein. The specifics of such implementation are not critical or essential to the present inventions, and will vary from application to application according to system designer requirements, so they are not included here. Again, while this embodiment of the present invention is set out in the context of a PC based host processor running Windows, it will be apparent to those skilled in the art that above description is merely an exemplary implementation. The referenced Control/Application Interface can be employed in numerous host processing/operating system environments, and in a variety of different coding organizations (high level or low level processing forms) well-known in the art.

Multiple AFE and Lower Sampling Speed Embodiment

Figure 6:
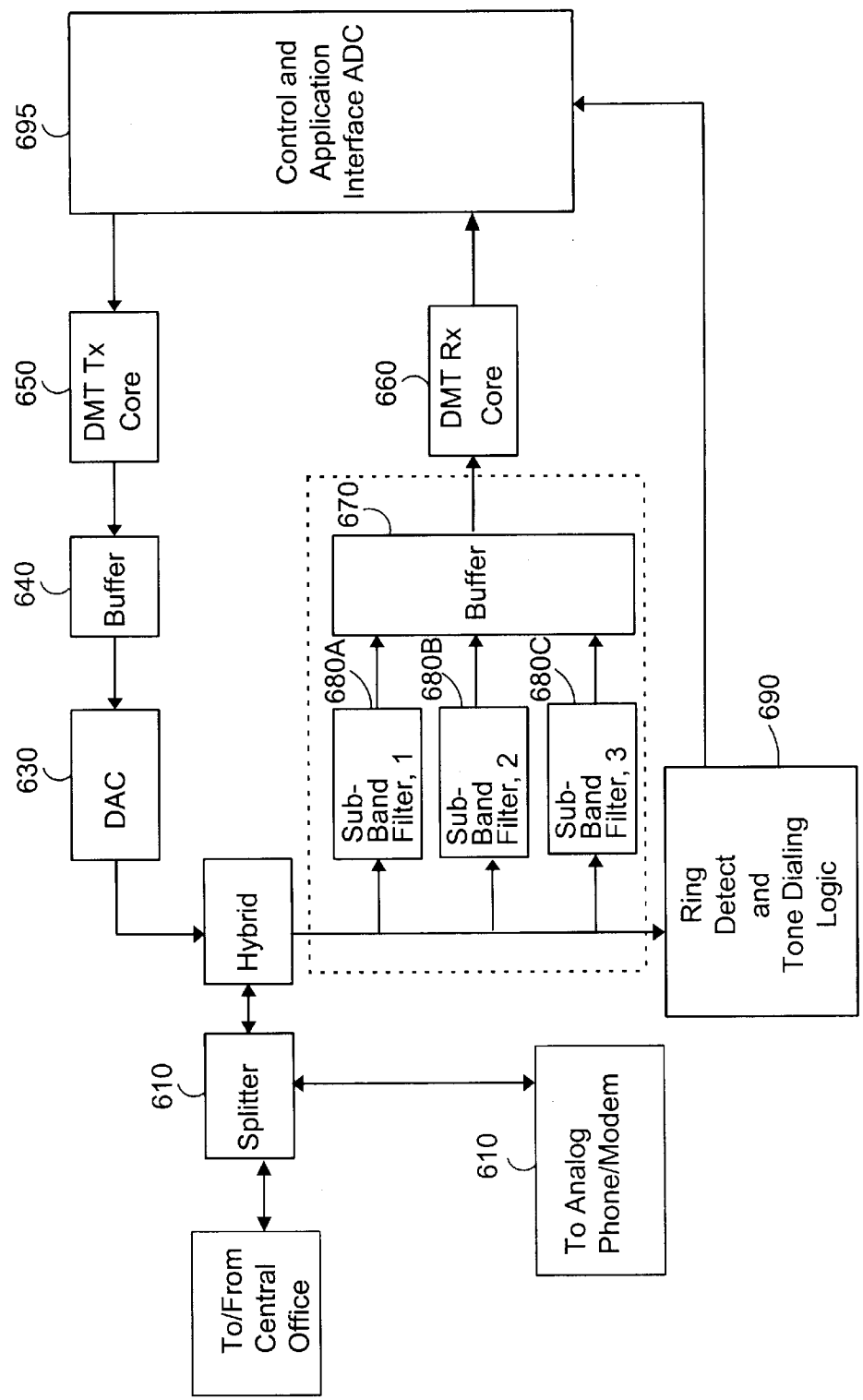
FIG. 6 is a block diagram of an implementation of a communications system employing the present invention, also adapted for use in an ADSL environment, in which it is depicted how a user can modularly expand throughput capability by adding additional AFE stages to process a greater percentage of the available bandwidth in the channel.

FIG. 6 illustrates an example of the present invention wherein a user can achieve significantly increased data throughput using multiple low cost, low sampling speed AFEs, generally designated 680A, 680B, 680C, etc. As described above, these AFEs may be in separate, modular form and configured in a bank form so that they can be incorporated conveniently on a printed circuit board (or similar mounting) or integrated in a single IC chip. Each AFE can be implemented in a fixed hardware configuration, or individually programmed/controlled to pass a certain portion of the downstream data transmission. Assuming suitable processing power is available for DMT modulation/demodulation (either through a dedicated or software implementation as described above in connection with FIGS. 3A and 3B) a user of such system can achieve substantially expanded functionality by upgrades having performance characteristics and costs of their choice.

Underlying Theory of Present Invention for ADSL/DMT Applications

A discussion of the underlying theory supporting the premise of the present invention now follows. In particular, this section shows the mathematical foundation for the use of multiple low speed AFE's to sample a full bandwidth ADSL/DMT signal. It will be apparent to those skilled in the art, after reading this discussion, that the present inventions can be advantageously used in a number of rate adaptable communications environments, including CAP implementations of ADSL.

DMT Transmitter

Figure 1D:
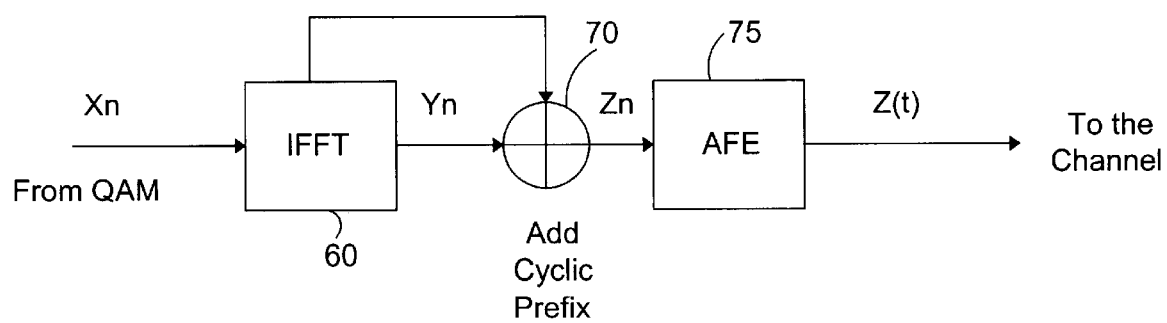
FIGS. 1D–1G are mathematical modellings and charts that further explain the underlying physical premises of the present invention based on DMT.
Figure 1E:
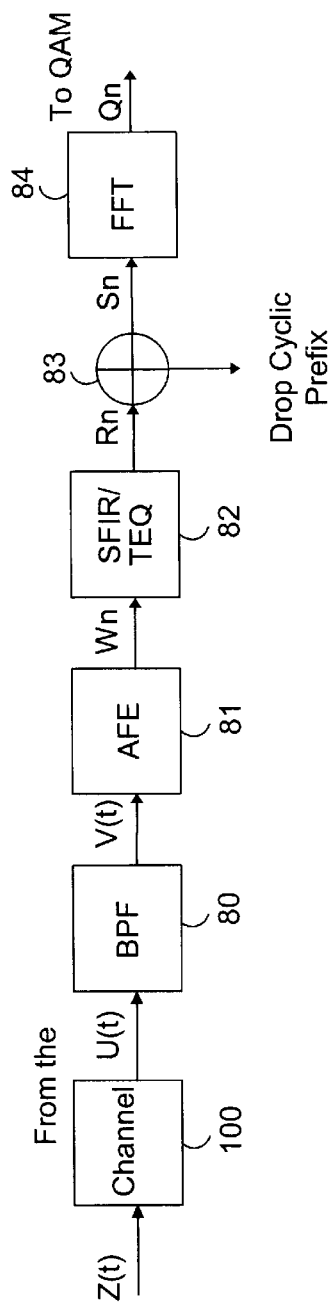

To simplify the present discussion, only a subset of the DMT transmitter is considered, as shown in FIGS. 1D and 1E. The combined model that includes the channel response and the DMT receiver is shown below, where only one branch of band-pass filtering and sampling is shown for simplicity. To further simplify, the channel response and the SFIR are combined together.

In this subsection, we analyze the signal over one band pass filtering process. The result shows that the DMT signals within the band pass can be recovered with the same use of impulse response shortening technique. With use of multiple AFE's that cover different frequency bands, all DMT sub-channels can be recovered.

IFFT

In an ADSL environment as shown in FIG. 1D, N(N=512) frequency domain variables are transformed into the time domain by IFFT block 60

$$y_n = \sum_{i=0}^{N-1} x_n e^{j2\pi in/N}$$

Cyclic Prefix c time domain variables at the end are added to the prefix of the sequence as shown in FIG. 1D by block 70 $\{z_n\}=\{z_{-c}, z_{-c+1}, \ldots, z_{-1}, z_0, z_1, \ldots, z_{N-1}\}=\{y_{N-c}, \ldots, y_{N-1}, y_0, \ldots, y_{N-1}\}$

AFE/DAC

Discrete time domain sequence are converted by AFE 75 to the continuous time domain waveform as follows:

$$z(t) = \sum_{n=-\infty}^{\infty} z_n p_{TX}(t - nT_c),$$

where $p_{TX}(t)$ is the transmitter pulse of the AFE/DAC used, and $T_c$ is the transmitter DAC dock period and equal to $$T_c = \frac{250 \, \mu sec}{N+c}$$

according to the DMT ADSL specifications.

Channel

With reference now to FIG. 1E, if the channel impulse response is $h_c(t)$, we have $$u(t) = \sum_{n=-\infty}^{\infty} z_n p_{RX}(t - nT_c)$$

where $p_{RX}(t) = p_{TX}(t) \otimes h_c(t)$.

Bandpass Filtering If the bandpass filter 80 has an impulse response of $h_{BPF}(t)$, $$v(t) = \sum_{n=-\infty}^{\infty} z_n p_{BPF}(t - nT_c)$$

where $p_{BPF}(t) = p_{RX}(t) \otimes h_{BPF}(t)$.

AFE/ADC

Let the sampling clock be $T_s = T_c \times L$. This means a slower sampling by a factor of L for AFE 81. Thus, $$w_k = \sum_{n=-\infty}^{\infty} z_n p_{BPF}(kT_s - nT_c) = \sum_{n=-\infty}^{\infty} z_n p_{BPF}([kL-n]T_c)$$

For causal pulse $p_{BPF}(t)$, we have $$w_k = \sum_{n=-\infty}^{\infty} z_n p_{BPF}((kL-n)T_c) = \sum_{n=0}^{\infty} z_{kL-n} p_{BPF}(nT_c)$$

Shortening FIR (SFIR)

After AFE discrete time sampling, a time domain equalizer (TEQ) called SFIR 82 is used to reduce the combined discrete time impulse response to a duration smaller than c. If the SFIR response is $h_{SFIR}[n]$, we have $$r_k = \sum_{i=0}^{\infty} w_{k-i} h_{SFIR}[i]$$

$$= \sum_{i=0}^{\infty} \left[ \sum_{n=-\infty}^{\infty} z_n p_{BPF}([kL-n-iL]T_c) \right] h_{SFIR}[i]$$

$$= \sum_{n=-\infty}^{\infty} z_n h_{tot}[kL-n]$$

$$= \sum_{n=0}^{\infty} z_{kL-n} h_{tot}[n]$$

where $$h_{tot}[kL-n] = \sum_{i=0}^{\infty} h_{SFIR}[i] p_{BPF}([kL-n-iL]T_c)$$

Physical Meaning of $h_{tot}[n]$

Figure 1F:
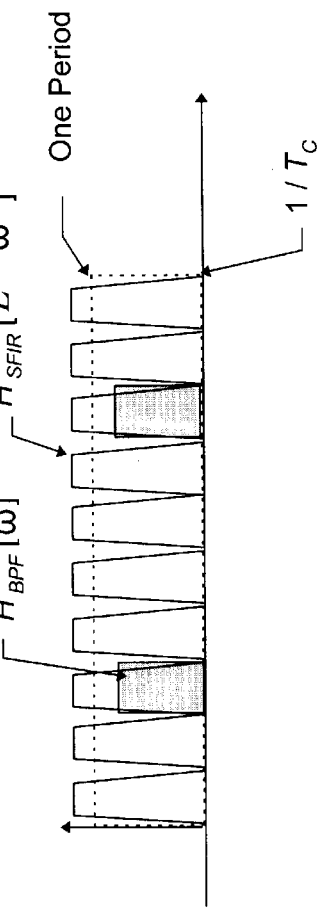

If we perform discrete Fourier transform at block 84 for $h_{tot}[n]$, we obtain $H_{tot}[\omega] = H_{SFIR}[L\omega] H_{BPF}[\omega]$ where $H_{SFIR}[L\omega]$ and $H_{BPF}[\omega]$ are the DFT's with period $1/(LT_c)$ and $1/T_c$, respectively. Their spectra can be illustrated as shown in FIG. 1F for L=5.

Dropping Cyclic Prefix

By dropping the cyclic prefix of length c/L, at block 83 we consider only $s_k = r_k, k=0, \ldots, N_1-1$, where $N_1 = N/L$.

FFT

Performing FFT at block 84 for $s_k$, $k=0, \ldots, (N/L)-1$, one obtains:

$$q_n = \sum_{l=0}^{N_1-1} s_l e^{-j2\pi n l / N_1}$$

$$= \sum_{k=0}^{N_1-1} r_k e^{-j2\pi n k / N_1}$$

$$= \sum_{k=0}^{N_1-1} \left( \sum_{i=0}^{\infty} z_{kL-i} h_{tot}[i] \right) e^{-j2\pi n k / N_1}$$

$$= \sum_{k=0}^{N_1-1} \sum_{i=0}^{\infty} z_{kL-i} h_{tot}[i] e^{-j2\pi n(kL-i)/N_1} e^{-j2\pi n i / N_1}$$

$$= \sum_{i=0}^{\infty} \sum_{k=0}^{N_1-1} z_{kL-i} e^{-j2\pi n(kL-i)/N_1} h_{tot}[i] e^{-j2\pi n i / N_1}$$

$$= \sum_{i=0}^{c} \sum_{k=0}^{N_1-1} z_{kL-i} e^{-j2\pi n(kL-i)/N_1} h_{tot}[i] e^{-j2\pi n i / N_1}$$

$$= \sum_{i=0}^{c} \sum_{k=0}^{N_1-1} y_{kL-i} e^{-j2\pi n(kL-i)/N_1} h_{tot}[i] e^{-j2\pi n i / N_1}$$

where we assume $h_{tot}[i]$ is only nonzero for $i=0, \ldots, c$. For a given i, let us define $l' = \lceil i/L \rceil$; We can then define $i' = l'L - i$, where $i'=0, \ldots, L-1$. Therefore, $i = l'L - i'$ From the above definitions, we have $$\sum_{k=0}^{N_1-1} y_{kL-i} e^{-j2\pi n(kL-i)/N_1} = \sum_{k=0}^{l'-1} y_{kL-i} e^{-j2\pi n(kL-i)/N_1} +$$

$$\sum_{k=l'}^{N_1-1} y_{kL-i} e^{-j2\pi n(kL-i)/N_1}$$

$$= \sum_{k=0}^{l'-1} y_{(k-l')L+i'} e^{-j2\pi n([k-l']L+i')/N_1} +$$

$$\sum_{k=l'}^{N_1-1} y_{(k-l')L+i'} e^{-j2\pi n([k-l']L+i')/N_1}$$

$$= \sum_{k=0}^{l'-1} y_{(k-l'+N_1)L+i'} e^{-j2\pi n([k-l'+N_1]L+i')/N_1} +$$

$$\sum_{k=0}^{N_1-1-l'} y_{kL+i'} e^{-j2\pi n(kL+i')/N_1}$$

$$= \sum_{k=N_1-l'}^{N_1-1} y_{kL+i'} e^{-j2\pi n(kL+i')/N_1} +$$

$$\sum_{k=0}^{N_1-1-l'} y_{kL+i'} e^{-j2\pi n(kL+i')/N_1}$$

$$= \sum_{k=0}^{N_1-1} y_{kL+i'} e^{-j2\pi n(kL+i')/N_1}$$

Therefore, $$q_n = \sum_{i=0}^{c} \sum_{k=0}^{N_1-1} y_{kL-i} e^{-j2\pi n(kL-i)/N_1} h_{tot}[i] e^{-j2\pi n i / N_1}$$

$$= \sum_{i=0}^{c} \left[ \sum_{k=0}^{N_1-1} y_{kL-i'} e^{-j2\pi n(kL+i')/N_1} \right] h_{tot}[i] e^{-j2\pi n i / N_1}$$

$$= \sum_{i=0}^{c} \left[ \sum_{k=0}^{N_1-1} \left( \sum_{l=0}^{N-1} x_l e^{j2\pi(kL+i')l/N} \right) e^{-j2\pi n(kL+i')/N_1} \right] h_{tot}[i] e^{-j2\pi n i / N_1}$$

$$= \sum_{i=0}^{c} \left[ \sum_{k=0}^{N_1-1} \sum_{l=0}^{N-1} x_l e^{j2\pi(kL+i')(l-n)/N} \right] h_{tot}[i] e^{-j2\pi n i / N_1}$$

$$= \sum_{i=0}^{c} \left[ \sum_{l=0}^{N-1} x_l \sum_{k=0}^{N_1-1} e^{j2\pi(kL+i')(l-n)/N} \right] h_{tot}[i] e^{-j2\pi n i / N_1}$$

Since $$\sum_{k=0}^{N_1-1} e^{j2\pi(kL+i')(l-n)/N} = 0 \text{ when } (l-n) \neq m N_1,$$

we have $$q_n = N_1 \sum_{i=0}^{c} \left[ \sum_{m=0}^{L-1} x_{mN_1+n} e^{j2\pi i' m / L} \right] h_{tot}[i] e^{-j2\pi n i / N_1}$$

Knowing that $h_{tot}[i]$ is zero for $i<0$ and $i>c$, we have $$q_n = N_1 \sum_{i=0}^{c} \left[ \sum_{m=0}^{L-1} x_{mN_1+n} e^{j2\pi i' m / L} \right] h_{tot}[i] e^{-j2\pi n i / N_1}$$

$$= N_1 \sum_{i=-\infty}^{\infty} \left[ \sum_{m=0}^{L-1} x_{mN_1+n} e^{j2\pi i' m / L} \right] h_{tot}[i] e^{-j2\pi n i / N_1}$$

-continued $$= N_1 \sum_{l=-\infty}^{\infty} \sum_{i'=0}^{L-1} \left[ \sum_{m=0}^{L-1} x_{mN_1+n} e^{j2\pi i'm/L} \right] h_{tot}[lL-i'] e^{-j2\pi n(lL-i')/N}$$

$$= N_1 \sum_{m=0}^{L-1} x_{mN_1+n} \sum_{i'=0}^{L-1} e^{j2\pi i'm/L} \sum_{l=-\infty}^{\infty} h_{tot}[lL-i'] e^{-j2\pi n(lL-i')/N}$$

Since $$\sum_{l=-\infty}^{\infty} h_{tot}[lL-i'] e^{-j2\pi n(lL-i')/N} = \sum_{l=-\infty}^{\infty} h_{tot}[lL-i'] e^{-j\omega(lL-i')T_c} \bigg|_{\omega=2\pi n/NT_c}$$

$$= F\left\{ h_{tot}(t) \sum_l \delta(t-[lL-i']T_c) \right\} \bigg|_{\omega=2\pi n/NT_c}$$

$$= \frac{1}{2\pi} \zeta_{tot}(\omega) \otimes \left[ \frac{2\pi}{LT_c} \sum_l \delta\left(\omega - \frac{2\pi l}{LT_c}\right) e^{j2\pi l i'/L} \right] \bigg|_{\omega=2\pi n/NT_c}$$

$$= = \frac{1}{LT_c} \sum_l \zeta_{tot}\left(\frac{2\pi n}{NT_c} - \frac{2\pi l}{LT_c}\right) e^{j2\pi l i'/L}$$

we have $$q_n = N_1 \sum_{m=0}^{L-1} x_{mN_1+n} \sum_{i'=0}^{L-1} e^{j2\pi i'm/L} \sum_{l=-\infty}^{\infty} h_{tot}[lL-i'] e^{-j2\pi n(lL-i')/N}$$

$$= N_1 \sum_{m=0}^{L-1} x_{mN_1+n} \sum_{i'=0}^{L-1} e^{j2\pi i'm/L} \frac{1}{LT_c} \sum_l H_{tot}\left(\frac{2\pi n}{NT_c} - \frac{2\pi l}{LT_c}\right) e^{j2\pi l i'/L}$$

$$= \frac{N_1}{LT_c} \sum_{m=0}^{L-1} x_{mN_1+n} \sum_l H_{tot}\left(\frac{2\pi n}{NT_c} - \frac{2\pi l}{LT_c}\right) \sum_{i'=0}^{L-1} e^{j2\pi(l+m)i'/L}$$

$$= \frac{N_1}{T_c} \sum_{m=0}^{L-1} x_{mN_1+n} H_{tot}\left(\frac{2\pi n}{NT_c} + \frac{2\pi m}{LT_c}\right)$$

$$= \frac{N_1}{T_c} \sum_{m=0}^{L-1} x_{mN_1+n} H_{tot}\left(\frac{2\pi}{NT_c}[mN_1+n]\right), \quad n = 0, \ldots, N_1 - 1$$

$$= N_1 \sum_{m=0}^{L-1} x_{mN_1+n} \overline{H}_{tot}[mN_1+n], \quad n = 0, \ldots, N_1 - 1$$

where $$\overline{H}_{tot}[n] = \frac{1}{T_c} H_{tot}\left(\frac{2\pi}{NT_c} n\right), \quad \text{for } 0 \le n < N$$

Relationship between $q_n$ and $x_n$

Figure 1G:
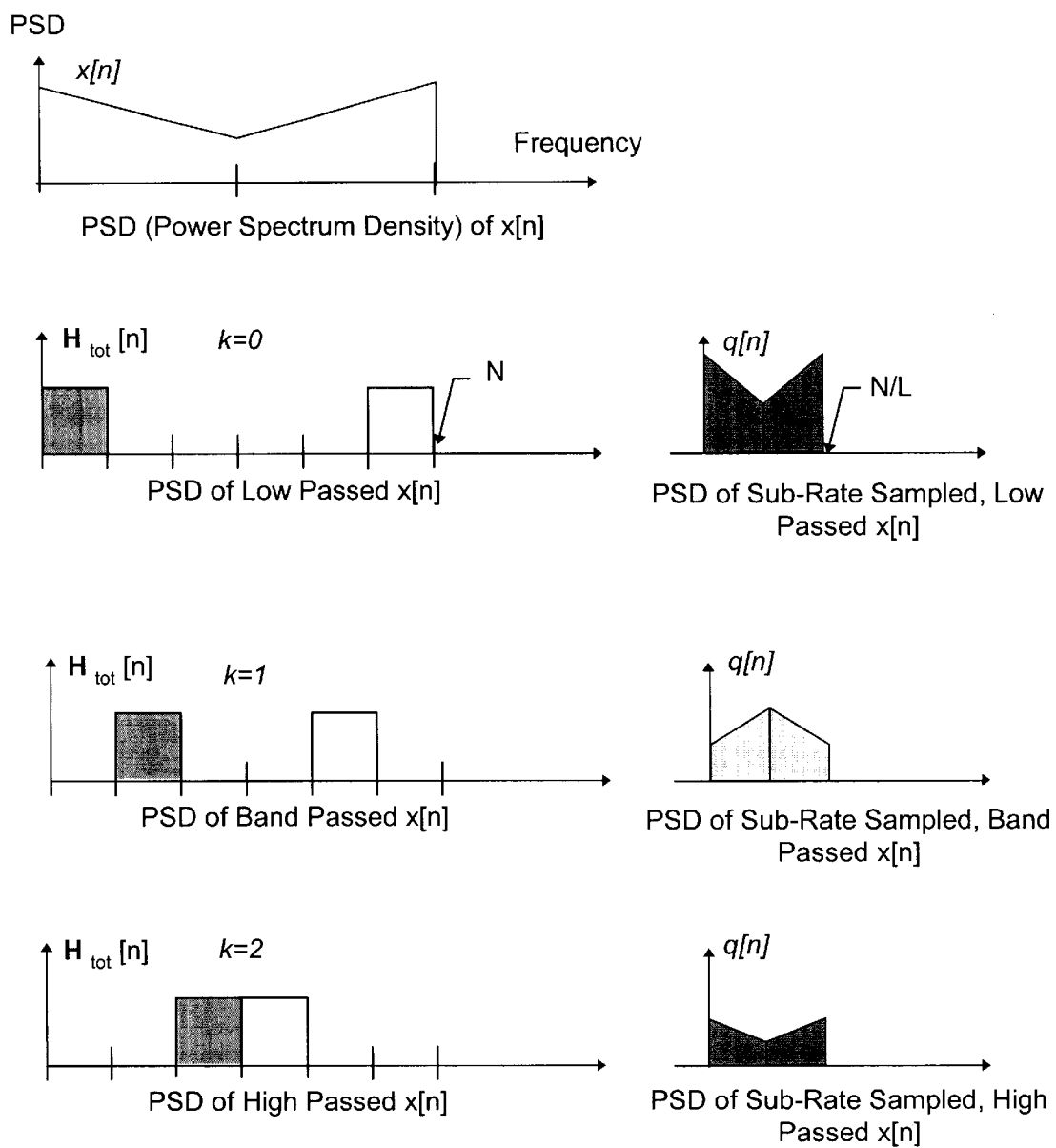

As shown in FIG. 1G if $\overline{H}_{tot}[n]$ is a bandpass filter and nonzero only in the intervals [k(N/2L), (k+1)(N/2L)] and [(2L−k−1)(N/2L), (2L−k)(N/2L)], where $0 \le k < L$, the possible values of m that $H_{tot}[m(N/L)+n]$ is nonzero for $0 \le n < (N/L)$ are as follows.

Even k

If k is even, we can have m=k/2 and $0 \le n < (N/2L)$ so that $H_{tot}[m(N/L)+n]$ is nonzero over the interval [k(N/2L), (k+1)(N/2L)], and m=(L−1)−k/2 and $(N/2L) \le n < (N/L)$ so that $H_{tot}[m(N/L)+n]$ is nonzero over the interval [(2L−k−1)(N/2L), (2L−k)(N/2L)].

Odd k

If k is odd, we can have m=(k−1)/2 and $(N/2L) \le n < (N/L)$ so that $H_{tot}[m(N/L)+n]$ is nonzero over the interval [k(N/2L), (k+1)(N/2L)], and m=L−(k−1)/2 and $0 \le n < (N/2L)$ so that $H_{tot}[m(N/L)+n]$ is nonzero over the interval [(2L−k−1)(N/2L), (2L−k)(N/2L)]. The above discussion is illustrated in FIG. 1G for L=3.

In another variation that can be used in the present invention, similar advantages to those obtained by limiting bandwidth in the received signal in the downstream transceiver can be obtained by also optionally limiting the upstream data rate of the transceiver as well. In other words, the ADSL standard provides for 31 channels in the upstream direction, but many applications do not require this amount of bandwidth. The constraints, requirements and costs associated with the DMT modulation signal processing, and DAC 330 also can be significantly reduced by transmitting only a sub-set of the available 31 sub-channels. The determination of the appropriate sub-channels would be accomplished in essentially the same manner as set forth above, except that the information on upstream sub-channel SNR usually must be determined by the upstream transceiver, and then fed back to the downstream transceiver. To save time and overhead complexity, and given the fact that there is less variation in bit capacity in sub-channels in this frequency band, one approach also would be to simply select a fixed sub-set of such sub-channels without regard to their actual performance characteristics. In a software modem environment, Control/Application software 500 would provide a user with selectable control to effectuate a restricted upstream transmission on limited sub-channels. Again, with respect to the ADSL standard, the only requirement in this respect is that the upstream pilot tone must also be transmitted to establish a valid data link. An optional limited "upstream" transmission can be effectuated in a variety of ways by the circuitry already described above in connection with FIGS. 2 and 3. The exact details of such implementation will be apparent to those of skill in the art given the present teachings.

Although the present invention has been described in terms of a preferred ADSL embodiment, it will be apparent to those skilled in the art that many alterations and modifications may be made to such embodiments without departing from the teachings of the present invention. For example, it is apparent that the present invention would be beneficial used in any xDSL or high speed multi-carrier application environment. Other types of VLSI and ULSI components beyond those illustrated in the foregoing detailed description can be used suitably with the present invention. Accordingly, it is intended that the all such alterations and modifications be included within the scope and spirit of the invention as defined by the following claims.

What is claimed is:

1. A high speed communications transceiver for communicating with an upstream transciever transmitting an analog signal using M data carrying signals within a bandwidth F through a channel to said system, said transceiver comprising:

a channel interface circuit for coupling to and receiving said analog signal from the channel; and a front end receiving circuit for sampling the analog signal and generating a digital signal based on such analog signal, the digital signal including data from a first frequency bandwidth portion f1 of said bandwidth F containing N data carrying signals, where N<M; and a front end transmitting circuit for transmitting control information to cause said upstream transceiver to transmit downstream data only using the N data carrying signals, said control information indicating to the upstream transceiver that: (i) only N of the M data carrying signals are desirable for downstream data transmission, even if said channel is capable of supporting more than N data carrying signals; and (ii) the system supports any transmission protocols used by said upstream transceiver; and (iii) that they are connected through a channel which should be treated by said upstream transceiver as having substantial signal attenuation characteristics for data signals other than the N data carrying signals; and a bus interface circuit for transmitting the digital signal to a host processing device.

2. The transceiver of claim 1, further including a host processor circuit in the host processing device for extracting selected data from the N data carrying signals.

3. The transceiver of claim 2, wherein the selection of the N data carrying signals can be made by the host processor circuit based in part on sampling capabilities of the front end receiving circuit.

4. The transceiver of claim 3, wherein the selection of the N data carrying signals is made by the host processor circuit based in part on the processing capabilities available to the host processor circuit.

5. The transceiver of claim 4, wherein the selection of the N data carrying signals can be performed by a calibration routine executed by the host processor circuit to determine the processing capabilities available to the host processor circuit.

6. The transceiver of claim 5, wherein the N data carrying signals can be determined by a user of the host processing device based on system parameter options presented to the user by an applications program running on the host processing device, and this selection can be confirmed by a verification routine executed by the host processing device.

7. The system of claim 1, wherein the selected data further includes data obtained from an additional second frequency bandwidth portion f2 of said bandwidth F, so that an additional number of data carrying signals P from the M data carrying signals (N+P<M) can be transmitted by the bus interface circuit to be processed by the host processor circuit.

8. The system of claim 1, wherein the front end receiving circuit includes: (i) a bandpass filter for passing the first frequency bandwidth portion fl of said bandwidth F; (ii) and an analog to digital converter; and wherein the bus interface circuit transmits the N data carrying signals to a host processor circuit that includes a host microprocessor, a programmable memory coupled to the microprocessor, and a data extraction routine located in the memory which can be executed by the microprocessor.

9. The system of claim 8, wherein a data received rate of the system can be increased by upgrading the host microprocessor with a second microprocessor which has increased signal processing capabilities, and coupling this second microprocessor to the bus interface circuit.

10. The system of claim 8, wherein the front end receiving circuit has a programmable frequency response.

11. The system of claim 1, further including a front end transmitting circuit for transmitting an upstream data transmission using a second frequency bandwidth F2 different from F, and L upstream data carrying signals, and where L<M.

12. A high speed communications system for receiving selected data contained in a number of modulated sub-channels N from an upstream transceiver capable of transmitting a number of modulated sub-channels M through a channel to said system using an analog signal, said system comprising:

a channel interface circuit for coupling to and receiving said analog signal from the channel;

an analog front end circuit for sampling the analog signal and converting it to a digital signal, the front end circuit including an anti-aliasing filter and an analog to digital converter, and the digital signal including data only from said number of sub-channels N, where N<=M, a bus interface circuit for transmitting the N sub-channels to a host processing device so that selected data can be demodulated from the N sub-channels;

a front end transmitting circuit for transmitting control information to cause said upstream transceiver to transmit downstream data only using the N sub-channels, said control information being used for: (i) permanently masking out all the available sub-channels except the N sub-channels for any subsequent downstream data transmission from said upstream transceiver; and further indicating that: (ii) the system supports any data transmission protocols used by the upstream transceiver; and (iii) also indicating that the system and upstream transceiver are connected through a channel which should be treated as having substantial signal attenuation characteristics for sub-channels other than the N sub-channels.

13. The system of claim 12, wherein the number of sub-channels N to be demodulated is based in part on sampling capabilities of the analog front end receiving circuit.

14. The system of claim 13, wherein the number of sub-channels N to be demodulated is selected by the host processing device based in part on the processing capabilities available to the host processing device.

15. The system of claim 14, wherein the selection of the number of sub-channels N can be N can be performed by a calibration routine executed by the host processing evice to determine the processing capabilities available to the host processing device.

16. The system of claim 14, wherein the number of sub-channels N can be determined by a user of the host processing device based on system parameter options presented to the user by an application program running on the host processing device, and this selection can be confirmed by a verification routine executed by the host processing device.

17. The system of claim 12, wherein the N sub-channels are selected by the host processor circuit based on data carrying capacities of the M available sub-channels.

18. The system of claim 12, wherein the selected data further includes data obtained from an additional second number of sub-channels P, so that an additional number of sub-channels (N+P<M) can be demodulated.

19. The system of claim 18, wherein the analog front end receiving circuit has a programmable frequency response that determines which of the N-sub channels are to be passed from the M available sub-channels.

20. The system of claim 12, wherein the analog front end receiving circuit includes: (i) a bandpass filter for passing the N sub-channels; and (ii) an analog to digital converter; and wherein the bus interface is configured to be coupled to a host processor circuit that includes a host microprocessor, a programmable memory coupled to the microprocessor, and a demodulation routine located in the memory which can be executed by the microprocessor.

21. The system of claim 20, wherein a received data rate of the system can be controlled by controlling the processing power of a host microprocessor in the host processing device coupled to the bus.

22. The system of claim 12, wherein the upstream transceiver uses discrete multi-tone (DMT) modulation for generating the M modulated sub-channels, and the upstream transceiver perceives that the system: (i) supports asymmetric digital subscriber loop (ADSL) transmission protocols; (ii) is comparable with T1.413 standards using a reduced number of sub-channels and a reduced data rate.

23. The system of claim 12, further including a front end transmitting circuit for transmitting an upstream data transmission using a second set of modulated sub-channels L separate from the M sub-channels, and where L<M.

24. A high speed communications data receiver for receiving data at a rate X through a channel from an upstream transceiver capable of transmitting a data stream at a rate Y, the receiver comprising:

a channel interface circuit for coupling to and receiving said data stream having said rate Y; and an analog front end circuit for data sampling a portion of the analog signal and converting it to a digital signal having said data rate X; and a bus interface circuit for transmitting the digital signal at said rate X to a host processing device, and for receiving a transmission control signal from the host processing device to cause said upstream transmitter to transmit at a data rate substantially equal to said data rate X during any data stream transmission; and a transmitting circuit for transmitting control information to cause said upstream transceiver to transmit downstream data using a set of N data carrying signals, which N data carrying signals constitute a subset of M signals available for carrying data in the channel, said control information including feedback information from the host processing device indicating to the upstream transceiver that: (i) only N of the M data carrying signals are desirable for downstream data transmission, even if said channel is capable of supporting more than N data carrying signals; and (ii) the receiver supports any upstream transceiver data transmission protocols; and (iii) that they are connected through a channel which should be treated by said upstream transceiver as having substantial signal attenuation characteristics for data signals other than the N data carrying signals; and wherein data sampling circuitry requirements of the analog front end are reduced because data sampling is only performed for a fractional portion k of the data stream, where k=M/N.

25. The system of claim 24, wherein the analog front end circuit further includes an anti-aliasing filter for filtering the analog data signal to generate the fractional portion of the data stream that requires data sampling and extracting.

26. The system of claim 24, wherein an upstream data transmission uses a second set of data carrying signals L separate from the M data carrying signals, and where L<M.

27. The system of claim 24, wherein the ratio of X to Y is approximately 0.5 or less, and this ratio can be increased through modular additions to the analog front end circuit.

28. A method of operating a high speed communications system that is coupled to a host processing device and an upstream transceiver through a channel capable of supporting an analog data transmission signal having a bandwidth F, said method comprising:

(a) configuring said system to achieve a receive data rate X; and (b) receiving an analog initialization signal having a bandwidth F from the upstream transceiver through the channel; and (c) generating a digital signal based on sampling a portion of the analog initialization signal corresponding to a first frequency bandwidth portion f1 sufficient to meet receive data rate X; and (d) transmitting the digital signal to a signal processing circuit, so that characteristics of data carrying signals contained within first frequency bandwidth portion f1 can be determined; and (e) generating feedback information indicating to the upstream transceiver that bandwidth other than the first frequency bandwidth f1 should not be used for data transmission, said feedback information further indicating that: (i) only N out of M available data carrying signals are desirable for downstream data transmission, where N<M/k, and k is an integer, even if said channel is capable of supporting more than N data carrying signals; and (ii) the system supports any transmission protocols used by the upstream transceiver; and (iii) that they are connected through a channel which should be treated by said upstream transceiver as having substantial signal attenuation characteristics for data signals other than the N data carrying signals; and (f) receiving an analog data transmission signal having a bandwidth f1 from said upstream transceiver; and (g) generating a digital signal based on sampling the analog data transmission signal; and (h) transmitting the digital signal to the host processing device so that it can be processed to extract selected data from the data carrying signals.

29. The method of claim 28, further including a step: determining an optimal size and location of first frequency bandpass portion f1 so as to minimize the amount of processing required to extract the data from the digital signal.

30. The method of claim 28, wherein the system transmits feedback information containing intentionally altered channel characteristic information.

31. The method of claim 28, wherein the M data signals include M modulated sub-channels, and the selected data is contained in N of the M sub-channels.

32. The method of claim 31, further including a step: determining an optimal set of N sub-channels so as to minimize the amount of processing required to extract the data from the digital signal.

33. The method of claim 32, further including a step wherein data protocol information pertaining Asymmetric Digital Subscriber Loops is transmitted by the upstream data transceiver so as to set up an ADSL compatible data link, which ADSL compatible data link uses a reduced number of sub-channels and a reduced data rate from that available using full rate T1.413 standards.

34. A high speed communications system for processing an analog data signal from a channel capable of supporting M modulated sub-channels, said system comprising:

a channel interface circuit for coupling to and receiving said analog data signal from the channel;

an analog front end circuit for processing the analog data signal and converting it to a digital signal;

a processing circuit for extracting data from the digital signal, the digital signal including data taken from a number N of said sub-channels, where N is intentionally selected to have a value less than M, and where N is negotiated with a remote transceiver during an initialization procedure; and further wherein during said initialization procedure, feedback information from the processing circuit indicates to said remote transceiver that: (i) only N of the M data sub-channels are to be used for data transmission, even if said channel is capable of supporting more than N sub-channels; and (ii) the system supports any data protocols used by the remote transceiver, including xDSL based protocols, so that a reduced rate but otherwise compatible version of such xDSL based protocols can be used in the channel; and (iii) that they are connected through a channel which should be treated by said remote transceiver as having substantial signal attenuation characteristics for sub-channels other than the N sub-channels.

35. The system of claim 34, where the N sub-channels are initially loaded with bit capacities that are left essentially unchanged unless transmission characteristics of said channel vary.

36. The system of claim 34, wherein the selection of the N sub-channels can be done during the initialization procedure.

37. The system of claim 34, wherein the value of N is based on signal processing capability of the processing circuit.

38. The system of claim 34, wherein a target data rate of the system can be increased by processing an additional number of sub-channels P from the M sub-channels, and where N+P<M.

39. The system of claim 34 further including a front end transmitting circuit for transmitting said feedback information.

40. The system of claim 34, wherein the upstream transceiver uses discrete multi-tone (DMT) modulation for generating the M modulated sub-channels, and the channel supports asymmetric digital subscriber loop (ADSL) transmission protocols.

41. A high speed communications system for processing an analog data signal from a channel capable of supporting M modulated sub-channels, said system comprising:

a channel interface circuit for coupling to and receiving said analog data signal from the channel;

an analog front end circuit for processing the analog data signal and converting it to a digital signal;

a bus interface circuit for transmitting the digital signal to a host processing device, and for receiving a transmission control signal from the host processing device to cause a remote transmitter to transmit using only a number N of said sub-channels, where N is intentionally selected to have a value less than M, and where N is negotiated with an upstream transceiver during an initialization procedure; and wherein said transmission control signal further specifies that: (i) only N of the M sub-channels are desirable for downstream data transmission, even if said channel is capable of supporting more than N sub-channels; and (ii) the system supports any data protocols used by the remote transmitter for transmitting data in said channel, including xDSL based protocols, so that a reduced rate but otherwise compatible version of such xDSL based protocols can be used in the channel; and (iii) that they are connected through a channel which should be treated by said remote transmitter as having substantial signal attenuation characteristics for sub-channels other than the N sub-channels.

42. The system of claim 41, wherein the value of N is based on signal processing capability of the host processing device.

43. The system of claim 41, wherein a data rate of the system can be increased by processing an additional number of sub-channels P from the M sub-channels, and where N+P<M.

44. The system of claim 41, wherein the upstream transceiver uses discrete multi-tone (DMT) modulation for generating the M modulated sub-channels, and the channel supports a T1.413 compatible data link using asymmetric digital subscriber loop (ADSL) transmission protocols.

45. A method of processing an xDSL signal from a digital subscriber loop, said method including the steps of:

negotiating a reduced data rate R' for said signal between a downstream and an upstream transceiver; and processing feedback information from the downstream transceiver indicating that: (i) only N out of M sub-channels available to the upstream transceiver are desirable for downstream data transmission, where N<=M/k, and k is an integer, even if said channel is capable of supporting more than N sub-channels; and (ii) the downstream transceiver supports any data protocols, including xDSL based protocols used for data transmission by the upstream transceiver, so that the upstream transceiver perceives that said downstream transceiver is fully compliant with T1.413 standards, but with a reduced number of sub-channels from that available using a full rate ADSL transceiver; and (iii) they are connected through a channel which should be treated by said upstream transceiver as having substantial signal attenuation characteristics for sub-channels other than said N sub-channels; and thereafter transmitting said xDSL signal from the upstream transciever to the downstream transceiver utilizing said sub-channels N to effectuate the reduced data rate R', where N is intentionally selected to be less than a maximum number of said sub-channels M supported by said digital subscriber loop;

wherein the number of sub-channels N is based on signal processing capability available to the downstream transceiver.

46. The method of claim 45, wherein the data rate of the system can be increased by processing an additional number of sub-channels P from the M sub-channels, and where N+P<M.

47. The method of claim 45, wherein the upstream transceiver uses discrete multi-tone (DMT) modulation for generating the M sub-channels.

48. The method of claim 45, wherein the reduced data rate R' can be specified by a user operating the downstream transceiver.

49. A method of processing an xDSL signal from a digital subscriber loop, said method including the steps of:

negotiating a reduced data rate R' for said signal between a downstream and an upstream transceiver; and processing feedback information from the downstream transceiver indicating that: (i) only N out of M subchannels available to the upstream transceiver are desirable for downstream data transmission, where N<=M/k, and k is an integer, even if said channel is capable of supporting more than N sub-channels; and (ii) the downstream transceiver supports any data protocols including xDSL based protocols used for data transmission by the upstream transceiver so that the upstream transceiver perceives that said downstream transceiver is fully compliant with T1.413 standards, but with a reduced number of sub-channels from that available using a full rate ADSL transceiver; and (iii) they are connected through a channel which should be treated by said upstream transceiver as having substantial signal attenuation characteristics for sub-channels other than said N sub-channels; and thereafter transmitting said xDSL signal from the upstream transciever to the downstream transceiver utilizing a frequency bandwidth f1 to carry said N sub-channels and to effectuate the reduced data rate R', where f1 is intentionally selected to be less than a maximum bandwidth F supported by said digital subscriber loop; and wherein the frequency bandwidth f1 is based on signal processing capability available to the downstream transceiver.

50. The system of claim 49, wherein the value of f1 is based on signal processing capability of a host processing device.

51. The system of claim 49, wherein a target data rate of the system can be increased by processing an additional frequency bandwidth f2, and where f1+f2<F.

52. The system of claim 49, wherein the channel supports asymmetric digital subscriber loop (ADSL) transmission protocols.

* * * * *